United States Patent

Inaki et al.

Patent Number: 5,230,062
Date of Patent: Jul. 20, 1993

[54] DATA PROCESSING APPARATUS AND METHOD FOR DEFINING SIZE AND TYPE OF DATA FIELD

[75] Inventors: Yosihiro Inaki, Gifu; Kazuhiko Shioho, Yao; Toshihiko Tokuda, Fukuoka; Yuuichirou Nonaka, Gifu; Katuhiro Nagata, Hachikai; Akira Noguchi, Gifu, all of Japan

[73] Assignee: Sanyo Electric Co., Ltd., Osaka, Japan

[21] Appl. No.: 507,134

[22] Filed: Mar. 7, 1990

[30] Foreign Application Priority Data

Mar. 7, 1989 [JP] Japan ................................ 1-54586
Mar. 7, 1989 [JP] Japan ................................ 1-54587

[51] Int. Cl.$^5$ ............................................. G06F 15/20
[52] U.S. Cl. .................................... 395/148; 395/149
[58] Field of Search ............................ 395/144–148, 395/155, 161, 117

[56] References Cited

U.S. PATENT DOCUMENTS

| 4,435,777 | 3/1984 | McCaskill et al. | 395/146 X |
| 4,802,104 | 1/1989 | Ogiso | 395/146 X |
| 4,835,735 | 5/1989 | Ikegami | 364/200 |
| 4,939,674 | 7/1990 | Price et al. | 395/148 |
| 4,962,475 | 10/1990 | Hernandez et al. | 395/146 |
| 5,084,820 | 1/1992 | Nagaya et al. | 395/146 X |
| 5,095,448 | 3/1992 | Obuchi et al. | 395/155 X |

FOREIGN PATENT DOCUMENTS 59-68040 4/1984 Japan .

Primary Examiner—Heather R. Herndon
Attorney, Agent, or Firm—Darby & Darby

[57] ABSTRACT

A data processing apparatus in which field data in card type data can be defined by designating a field type and a display area with a cursor key by a simple operation such as that of a word processor. When the field data is repetitively defined, a repetitive area is appointed by operating the cursor key, and the entire repetitive area can be copied by a single operation without copying for each field.

20 Claims, 81 Drawing Sheets

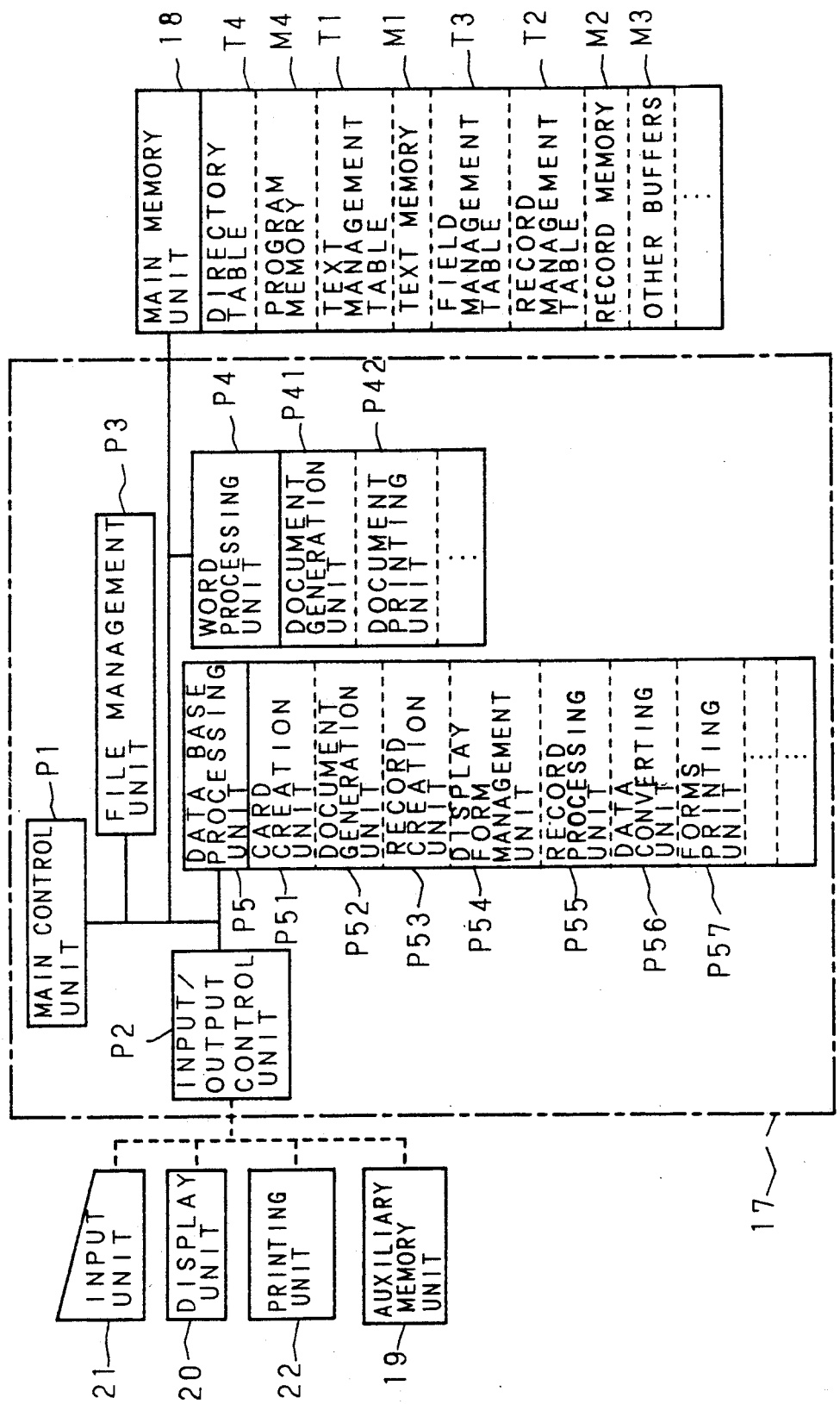

FIG. 5A

```
         PATENT DIV. CABINET
D/OPEN/NEW/DOCUMENT/////AUTHOR/////DATE///PAPER//N0.OF PAGE/VER/.
1  PATENT REGISTER                          A4 LONG    91  3
   DATA BASE
2  COST MANAGEMENT DATA      YAMAKAWA   63.10.3  A4 LONG  137  1
   IN FIRST SALES DEP.
3  PERSONAL CHANGES REPORT   TAGANMI    63.12.26 A4 LONG    7  1
   OF LATTER HALF OF '88
4  EQUIPMENT COST MANAGIMENT YASUKO KAMEI 63.11.30 B5 LONG 176  3
   DATA IN GENERAL AFFAIRS DEP.
5  TOTAL LIST OF EVERY      HIROMI WATANABE 63.12.1 B4 WID  2  1
   DEP. IN NOV. '88
```

C₁

EDIT  PRINT  MERGE  COMMUNICATE  AUXILIARY  DATA PROCCESSING

FIG. 5B

PATENT DIV.CABINET

| | | AUTHOR | DATE | PAPER | No.OF PAGE | VER. |
|---|---|---|---|---|---|---|
| 0 | OPEN NEW DOCUMENT | | | | | |
| 1 | PATENT REGISTER DATA BASE | | | A4 LONG | 91 | 3 |
| 2 | COST MANAGEMENT DATA IN FIRST SALES DEP. | YAMAKAWA | 63.10.3 | A4 LONG | 137 | 1 |
| 3 | PERSONAL CHANGES REPORT OF LATTER HALF OF '88 | TAGANMI | 63.12.26 | A4 LONG | 7 | 1 |
| 4 | EQUIPMENT COST MANAGIMENT DATA IN GENERAL AFFAIRS DEP. | YASUKO KAMEI | 63.11.30 | B5 LONG | 176 | 3 |
| 5 | TOTAL LIST OF EVERY DEP. IN NOV. '88 | HIROMI WATANABE | 63.12.1 | B4 WID | 2 | 1 |

```
DOCUMENT NAME (ADDRESS BOOK ■            )
AUTHOR        (KEIKO OKURA )
DATE          (61.1.1  )
PAPER  A4 LONG.  MAX.
CHARACTER NUMBER    ( 40) TO 41 CHARACTERS
LINE NUMBER         ( 40) TO 47 LINES
```

FULL SIZE    ROMAN CHARACTER

FIG. 5E

```
▷                                                                    ◁
▷    NAME       Xxxxxxxxx                                            ◁
▷                                                                    ◁
▷    ADDRESS    Xxxxxxxxxxxxxxxxxxx                                  ◁
▷                                                                    ◁
▷    TELEPHONE  Xxxxxxxxxxxxx                                        ◁
▷                                                                    ◁
▷    AGE        NNN  YEAR-OLD■  ← C2                                 ◁
▷                                                                    ◁
▷                                                                    ◁
▷                                                                    ◁
▷                                                                    ◁
▷                                                                    ◁
▷                                                                    ◁
▷                                                                    ◁
▷                                                                    ◁
         |....|....|....|....|....■....|....|....|....|
             10        20        30        40
```

| CARD DEFINITION | :CHARACTER NUMERIC DATE TABLE APPOINT. ☐ | ☐GRAPHIC ☐ ☐ ☐ |
|---|---|---|
| FULL SIZE ROMAN CHARACTER | | PAGE. 1  LINE. 8 |

FIG. 5F

```
▷                                                                    ◁
▷    NAME       Xxxxxxxxx                                            ◁
▷                                                                    ◁
▷    ADDRESS    Xxxxxxxxxxxxxxxxxxxx                                 ◁
▷                                                                    ◁
▷    TELEPHONE  Xxxxxxxxxxxxx                                        ◁
▷                                                                    ◁
▷    AGE        NNN  YEAR-OLD                                        ◁
▷                                                                    ◁
▷                                                                    ◁
▷                                                                    ◁
▷                                                                    ◁
▷                                                                    ◁
▷                                                                    ◁
▷                                                                    ◁
▷                                                                    ◁
         |....|....|....|....|....|....|....|....|....|
             10        20        30        40
```

| COMPLETE CARD DEFINITION AND PROCEED TO EXECUTION | STOP CARD DEFINITION | NOT STORE |
|---|---|---|
| FULL SIZE ROMAN CHARACTER | | PAGE. 1  LINE. 8 |

FIG. 5I

```
NAME      ■
ADDRESS
TELEPHONE
AGE
```

| FULL ROMAN | CHARACTER | 2nd | LINE,2 |
| SIZE CHARACTER | FIELD | SHEET | |

FIG. 5J

```
NAME      ICHIRO YAMASHITA  ■
ADDRESS   KYOTO-FU,FUSHIMI-KU,KOSHIRO-MACHI,5-5-5
TELEPHONE 0720-55-6666
AGE       20
```

| FULL ROMAN | CHARACTER | 2nd | LINE,2 |
| SIZE CHARACTER | FIELD | SHEET | |

FIG. 5K

```
▷                                                                    ◁
▷   NAME        KATSUO AKIYAMA ■                                     ◁
▷                                                                    ◁
▷   ADDRESS     OSAKA-FU.HIRAKATA-SHI.OKAYAMATE 1-12                  ◁
▷                                                                    ◁
▷   TELEPHONE   0720-44-5800                                         ◁
▷                                                                    ◁
▷   AGE         41 YEAR-OLD                                          ◁
▷                                                                    ◁
▷                                                                    ◁
▷                                                                    ◁
▷                                                                    ◁
▷                                                                    ◁
▷                                                                    ◁
▷                                                                    ◁
▷                                                                    ◁
       |........|........■........|........|
           10       20       30       40
 FULL  ROMAN       CHARACTER         12th    LINE,2
 SIZE  CHARACTER   FIELD             SHEET
```

FIG. 5L

| | NAME | ADDRESS | TELEPHONE |
|---|---|---|---|
| 0001 | KAZUHIKO TAKEYAMA | OSAKA-FU,KITA-KU,NAKANOSHIMA 1-3-2 | 06-987-12 |
| 0002 | ICHIRO YAMASHITA | KYOTO-FU,FUSHIMI-KU,KOSHIRO-MACHI 5-5-5 | 0720-55-6 |
| 0003 | YOSHIO IDA | HYOGO-KEN,TAKARAZUKA-SHI,MINAMI-MACHI 1-5-14 | 06-447-82 |
| 0004 | MICHIKO OSHITA | OSAKA-FU,MORIGUCHI-SHI,AKAIE 23-1-5 | 06-412-65 |
| 0005 | SHIRO KAWAMOTO | HYOGO-KEN,AMAGASAKI-SHI,FUKAE 3-5-12 | 078-663-2 |
| 0006 | ICHIRO NISHIDA | KYOTO-FU,UZI-SHI,UZI 2-3-10 | 0774-22-3 |
| 0007 | HIROSHI SAKAMOTO | KYOTO-FU,KYOTO-SHI,SAKYO-KU,KITANO 2-3 | 075-326-6 |
| 0008 | TATSUO TAKEUCHI | OSAKA-FU,HIRAKATA-SHI,TAMIYA 19-14 | 0720-28-3 |
| 0009 | KUMIKO YAMAKAWA | KYOTO-FU,YAWATA-SHI,OTOKOYAMA 5-2-10 | 075-855-7 |
| 0010 | TOSHIAKI YAMAGUCHI | OSAKA-FU,NEYAGAWA-SHI,YOSHIMOTO 5-2-2 | 0720-22-4 |
| 0011 | MASAKI HARADA | HYOGO-KEN,ASHIYA-SHI,KURAKUEN 11-15 | 0722-54-6 |
| 0012 | KATSUO AKIYAMA | OSAKA-FU,HIRAKATA-SHI,OKAYAMATE 1-12 | 0720-44-5 |

FIG. 5M

| | NAME | AGE | ADDRESS | TELEPHONE |
|---|---|---|---|---|
| 0001 | KAZUHIKO TAKEYAMA | 32 | OSAKA-FU,KITA-KU,NAKANOSHIMA 1-3-2 | 06-987-1234 |
| 0002 | ICHIRO YAMASHITA | 20 | KYOTO-FU,FUSHIMI-KU,KOSHIRO-MACHI 5-5-5 | 0720-55-6666 |
| 0003 | YOSHIO IDA | 35 | HYOGO-KEN,TAKARAZUKA-SHI,MINAMI-MACHI 1-5-14 | 06-447-8231 |
| 0004 | MICHIKO OSHITA | 25 | OSAKA-FU,MORIGUCHI-SHI,AKAIE 23-1-5 | 06-412-6580 |
| 0005 | SHIRO KAWAMOTO | 38 | HYOGO-KEN,AMAGASAKI-SHI,FUKAE 3-5-12 | 078-663-2005 |
| 0006 | ICHIRO NISHIDA | 30 | KYOTO-FU,UZI-SHI,UZI 2-3-10 | 0774-22-3591 |
| 0007 | HIROSHI SAKAMOTO | 31 | KYOTO-FU,KYOTO-SHI,SAKYO-KU,KITANO 2-3 | 075-326-6259 |
| 0008 | TATSUO TAKEUCHI | 39 | OSAKA-FU,HIRAKATA-SHI,TAMIYA 19-14 | 0720-28-3357 |
| 0009 | KUMIKO YAMAKAWA | 21 | KYOTO-FU,YAWATA-SHI,OTOKOYAMA 5-2-10 | 075-855-7773 |
| 0010 | TOSHIAKI YAMAGUCHI | 45 | OSAKA-FU,NEYAGAWA-SHI,YOSHIMOTO 5-2-2 | 0720-22-4157 |
| 0011 | MASAKI HARADA | 38 | HYOGO-KEN,ASHIYA-SHI,KURAKUEN 11-15 | 0722-54-6623 |
| 0012 | KATSUO AKIYAMA | 41 | OSAKA-FU,HIRAKATA-SHI,OKAYAMATE 1-12 | 0720-44-5800 |

FIG. 5N

| | NAME | AGE | ADDRESS | TELEPHONE |
|---|---|---|---|---|
| 0001 | KAZUHIKO TAKEYAMA | 32 | OSAKA-FU,KITA-KU,NAKANOSHIMA 1-3-2 | 06-987-1234 |
| 0002 | ICHIRO YAMASHITA | 20 | KYOTO-FU,FUSHIMI-KU,KOSHIRO-MACHI 5-5-5 | 0720-55-6666 |
| 0003 | YOSHIO IDA | 35 | HYOGO-KEN,TAKARAZUKA-SHI,MINAMI-MACHI 1-5-14 | 06-447-8231 |
| 0004 | MICHIKO OSHITA | 25 | OSAKA-FU,MORIGUCHI-SHI,AKAIE 23-1-5 | 06-412-6580 |
| 0005 | SHIRO KAWAMOTO | 38 | HYOGO-KEN,AMAGASAKI-SHI,FUKAE 3-5-12 | 078-663-2005 |
| 0006 | ICHIRO NISHIDA | 30 | KYOTO-FU,UZI-SHI,UZI 2-3-10 | 0774-22-3591 |
| 0007 | HIROSHI SAKAMOTO | 31 | KYOTO-FU,KYOTO-SHI,SAKYO-KU,KITANO 2-3 | 075-326-6259 |
| 0008 | TATSUO TAKEUCHI | 39 | OSAKA-FU,HIRAKATA-SHI,TAMIYA 19-14 | 0720-28-3357 |
| 0009 | KUMIKO YAMAKAWA | 21 | KYOTO-FU,YAWATA-SHI,OTOKOYAMA 5-2-10 | 075-855-7773 |
| 0010 | TOSHIAKI YAMAGUCHI | 45 | OSAKA-FU,NEYAGAWA-SHI,YOSHIMOTO 5-2-2 | 0720-22-4157 |
| 0011 | MASAKI HARADA | 38 | HYOGO-KEN,ASHIYA-SHI,KURAKUEN 11-15 | 0722-54-6623 |
| 0012 | KATSUO AKIYAMA | 41 | OSAKA-FU,HIRAKATA-SHI,OKAYAMATE 1-13 | 0720-44-5800 |

CHARACTER INPUT : [OSAKA-FU,HIRAKATA-SHI,OKAYAMATE 1-13■]

FIG. 5O

```
NAME        KATSUO AKIYAMA ■
ADDRESS     OSAKA-FU.HIRAKATA-SHI.OKAYAMATE 1-13
TELEPHONE   0720-44-5800
AGE         41 YEAR-OLD
```

```
         10            20            30            40
```

| FULL ROMAN | CHARACTER | 12th | LINE,2 |
| SIZE CHARACTER | FIELD | SHEET | |

FIG. 5P

```
NAME        KATSUO AKIYAMA
ADDRESS     OSAKA-FU.HIRAKATA-SHI.OKAYAMATE 1-13
TELEPHONE   0720-44-5800
AGE         41 YEAR-OLD
```

ADDRESS = [OSAKA✻■                    ]
                   $L_2$

| FULL ROMAN | CHARACTER:DESIGNATE SELECT | ( INSERT ) |
| SIZE CHARACTER | CONDITIONS | |

FIG. 5Q

| | NAME | AGE | ADDRESS | TELEPHONE |
|---|---|---|---|---|
| 0001 | KAZUHIKO TAKEYAMA | 32 | OSAKA-FU,KITA-KU,NAKANOSHIMA 1-3-2 | 06-987-1234 |
| 0002 | MICHIKO OSHITA | 25 | OSAKA-FU,MORIGUCHI-SHI,AKAIE 23-1-5 | 06-412-6580 |
| 0003 | TATSUO TAKEUCHI | 39 | OSAKA-FU,HIRAKATA-SHI,TAMIYA 19-14 | 0720-28-3357 |
| 0004 | TOSHIAKI YAMAGUCHI | 45 | OSAKA-FU,NEYAGAWA-SHI,YOSHIMOTO 5-2-2 | 0720-22-4157 |
| 0005 | KATSUO AKIYAMA | 41 | OSAKA-FU,HIRAKATA-SHI,OKAYAMATE 1-13 | 0720-44-5800 |

FIG. 5R

| | NAME | AGE | ADDRESS | TELEPHONE |
|---|---|---|---|---|
| 0001 | KAZUHIKO TAKEYAMA | 32 | OSAKA-FU,KITA-KU,NAKANOSHIMA 1-3-2 | 06-987-1234 |
| 0002 | ICHIRO YAMASHITA | 20 | KYOTO-FU,FUSHIMI-KU,KOSHIRO-MACHI 5-5-5 | 0720-55-6666 |
| 0003 | YOSHIO IDA | 35 | HYOGO-KEN,TAKARAZUKA-SHI,MINAMI-MACHI 1-5-14 | 06-447-8231 |
| 0004 | MICHIKO OSHITA | 25 | OSAKA-FU,MORIGUCHI-SHI,AKAIE 23-1-5 | 06-412-6580 |
| 0005 | SHIRO KAWAMOTO | 38 | HYOGO-KEN,AMAGASAKI-SHI,FUKAE 3-5-12 | 078-663-2005 |
| 0006 | ICHIRO NISHIDA | 30 | KYOTO-FU,UZI-SHI,UZI 2-3-10 | 0774-22-3591 |
| 0007 | HIROSHI SAKAMOTO | 31 | KYOTO-FU,KYOTO-SHI,SAKYO-KU,KITANO 2-3 | 075-326-6259 |
| 0008 | TATSUO TAKEUCHI | 39 | OSAKA-FU,HIRAKATA-SHI,TAMIYA 19-14 | 0720-28-3357 |
| 0009 | KUMIKO YAMAKAWA | 21 | KYOTO-FU,YAWATA-SHI,OTOK | |
| 0010 | TOSHIAKI YAMAGUCHI | 45 | OSAKA-FU,NEYAGAWA-SHI,YO | |
| 0011 | MASAKI HARADA | 38 | HYOGO-KEN,ASHIYA-SHI,KUR | |
| 0012 | KATSUO AKIYAMA | 41 | OSAKA-FU,HIRAKATA-SHI,OK | |

DOCUMENT NAME [ADDRESS BOOK]
AUTHER [KEIKO OKURA]
DATE [ 1. 1. '89]

VER. 2

FULL SIZE    ROMAN CHARACTER

FIG. 6

| PROCESSING INFORMATION | NAME OF 1st. SHEET | ADDRESS OF 1st. SHEET | | | |
|---|---|---|---|---|---|
| TELEPHONE OF 1st. SHEET | AGE OF 1st. SHEET | PROCESSING INFORMATION | NAME OF 2nd. SHEET | ADDRESS OF 2nd. SHEET | |
| 2nd. SHEET | | TELEPHONE OF 2nd. SHEET | | AGE OF 2nd. SHEET | ---- |
| ---- | | | | | |
| | | | | | |

FIG. 7

| NO | TYPE | DATA LENGTH | LINE NUMBER | STARTING COLUMN NUMBER | FIELD NAME | ----- |
|---|---|---|---|---|---|---|
| 1 | CHARACTER | 20 | 2 | 9 | NAME | ----- |
| 2 | CHARACTER | 40 | 4 | 9 | ADDRESS | ----- |
| 3 | CHARACTER | 30 | 6 | 9 | TELEPHONE | ----- |
| 4 | NUMERIC | 6 | 8 | 9 | AGE | ----- |

FIG. 11A

| BUSINESS-CARD MANAGEMENT | |
|---|---|
| COMPANY NAME | ■ |
| FURIKANA | |
| NAME | |
| ADDRESS OF COMPANY | |
| TEL | |
| FAX | |

10  20  30  40

CARD DEFINITION: CHARACTER NUMERIC DATE TABLE APPOINT. ☐  ☐GRAPHIC☐ ☐ ☐

FULL ROMAN SIZE CHARACTER          PAGE. 1  LINE. 4

FIG. 11B

| BUSINESS-CARD MANAGEMENT | |
|---|---|
| COMPANY NAME | ■ |
| FURIKANA | |
| NAME | |
| ADDRESS OF COMPANY | |
| TEL | |
| FAX | |

10  20  30  40

CHARACTER FIELD POSITION(AREA) DEFINITION
: CHARACTER NUMBER HALF SIZE 1 CHARACTER

FIG. IIC

| BUSINESS-CARD MANAGEMENT | |
|---|---|
| COMPANY NAME | ■■■■■■■■■■■■■■ |
| FURIKANA | |
| NAME | |
| ADDRESS OF COMPANY | |
| TEL | |
| FAX | |

```
          10        20        30        40
```

CHARACTER FIELD POSITION(AREA) DEFINITION
:CHARACTER NUMBER HALF SIZE 44 CHARACTERS

FIG. IID

| BUSINESS-CARD MANAGEMENT | |
|---|---|
| COMPANY NAME | Xxxxxxxxxxxxxxxxxxxxxx■ |
| FURIKANA | |
| NAME | |
| ADDRESS OF COMPANY | |
| TEL | |
| FAX | |

```
          10        20        30        40
```

CARD DEFINITION:CHARACTER NUMERIC DATE TABLE APPOINT.☐  ☐GRAPHIC☐☐☐

FULL ROMAN SIZE CHARACTER                    PAGE.1  LINE.4

FIG. IIE

| BUSINESS-CARD MANAGEMENT | |
|---|---|
| COMPANY NAME | Xxxxxxxxxxxxxxxxxxxx |
| FURIKANA | ■ |
| NAME | |
| ADDRESS OF COMPANY | |
| TEL | |
| FAX | |

10    20    30    40

CARD DEFINITION: CHARACTER NUMERIC DATE TABLE APPOINT. ☐  ☐ GRAPHIC ☐☐☐

FULL SIZE    ROMAN CHARACTER                    PAGE.1  LINE.6

FIG. IIF

| BUSINESS-CARD MANAGEMENT | |
|---|---|
| COMPANY NAME | Xxxxxxxxxxxxxxxxxxxx |
| FURIKANA | ■ |
| NAME | |
| ADDRESS OF COMPANY | |
| TEL | |
| FAX | |

10    20    30    40

| SUPER-SCRIPT | SUB-SCRIPT | LATERALLY DOUBLED HALF SIZE | LATERALLY DOUBLED FULL SIZE | LONGI-TUDINALLY DOUBLED HALF SIZE | LONGI-TUDINALLY DOUBLED FULL SIZE | QUADRU-PLE HALF SIZE | QUADRU-PLE FULL SIZE | AREA APPOINT ☐ |

FIG. 11G

| BUSINESS-CARD MANAGEMENT | |
|---|---|
| COMPANY NAME | Xxxxxxxxxxxxxxxxxxxxx |
| FURIKANA | ■ |
| NAME | |
| ADDRESS OF COMPANY | |
| TEL | |
| FAX | |

```
         10        20        30        40
```

CARD DEFINITION : CHARACTER NUMERIC DATE TABLE APPOINT. ☐  ☐GRAPHIC ☐☐☐

SUBSCRIPT   ROMAN CHARACTER                PAGE. 1   LINE. 6

FIG. 11H

| BUSINESS-CARD MANAGEMENT | |
|---|---|
| COMPANY NAME | Xxxxxxxxxxxxxxxxxxxxx |
| FURIKANA | |
| NAME | |
| ADDRESS OF COMPANY | |
| TEL | |
| FAX | |

```
         10        20        30        40
```

CHARACTER FIELD POSITION(AREA) DEFINITION
 : CHARACTER NUMBER HALF SIZE 1 CHARACTER

FIG. 11I

| BUSINESS-CARD MANAGEMENT | |
|---|---|
| COMPANY NAME | Xxxxxxxxxxxxxxxxxxxxx |
| FURIKANA | ███████████████ |
| NAME | |
| ADDRESS OF COMPANY | |
| TEL | |
| FAX | |

```
    10        20        30        40
```

CHARACTER FIELD POSITION(AREA) DEFINITION
:CHARACTER NUMBER HALF SIZE 40 CHARACTERS

FIG. 11J

| BUSINESS-CARD MANAGEMENT | |
|---|---|
| COMPANY NAME | Xxxxxxxxxxxxxxxxxxxxx |
| FURIKANA | Xxxxxxxxxxxxxxxxxxxxxxxxxxxxx■ |
| NAME | |
| ADDRESS OF COMPANY | |
| TEL | |
| FAX | |

```
    10        20        30        40
```

CARD DEFINITION :CHARACTER NUMERIC DATE TABLE APPOINT.☐  ☐GRAPHIC ☐☐☐

SUBSCRIPT  ROMAN CHARACTER                PAGE.1  LINE.6

FIG. IIK

| | BUSINESS-CARD MANAGEMENT | |
|---|---|---|
| | COMPANY NAME | Xxxxxxxxxxxxxxxxxxxxxx |
| | FURIKANA | Xxxxxxxxxxxxxxxxxxxxxxxxxxxxxxxxxxx |
| | NAME | X x x x x x x x x x |
| | ADDRESS OF COMPANY | Xxxxxxxxxxxxxxxxxxxxxxxxxxxxxxxxxx |
| | TEL | Xxxxxxxxxxxxxxxx |
| | FAX | Xxxxxxxxxxxxxxxx■ |

```
.........|.........|.........|.........|
         10        20        30        40
```

CARD DEFINITION: CHARACTER NUMERIC DATE TABLE APPOINT. ☐  ☐GRAPHIC ☐ ☐ ☐

HALF SIZE ROMAN CHARACTER          PAGE. 1   LINE. 6

FIG. IIL

| BUSINESS-CARD MANAGEMENT | |
|---|---|
| COMPANY NAME | ■ |
| FURIKANA | |
| NAME | |
| ADDRESS OF COMPANY | |
| TEL | |
| FAX | |

```
         10        20        30        40
```

FULL SIZE  ROMAN CHARACTER  CHARACTER FIELD           PAGE.1  LINE.4

FIG. IIM

| BUSINESS-CARD MANAGEMENT | |
|---|---|
| COMPANY NAME | SYNYO DENKI KABUSHIKI KAISHA■ |
| FURIKANA | |
| NAME | |
| ADDRESS OF COMPANY | |
| TEL | |
| FAX | |

```
         10        20        30        40
```

ROMAN CHARACTER  CHARACTER FIELD           PAGE.1  LINE.4

FIG. 11N

| BUSINESS-CARD MANAGEMENT | |
|---|---|
| COMPANY NAME | SYNYO DENKI KABUSHIKI KAISHA |
| FURIKANA | ■ |
| NAME | |
| ADDRESS OF COMPANY | |
| TEL | |
| FAX | |

```
..........|..........|..........|..........|
         10        20        30        40
```

SUBSCRIPT  ROMAN CHARACTER  CHARACTER FIELD          PAGE.1  LINE.6

FIG. 11O

| BUSINESS-CARD MANAGEMENT | |
|---|---|
| COMPANY NAME | SYNYO DENKI KABUSHIKI KAISHA |
| FURIKANA | taro sanyo ■ |
| NAME | |
| ADDRESS OF COMPANY | |
| TEL | |
| FAX | |

```
..........|..........|..........|..........|
         10        20        30        40
```

SUBSCRIPT  ROMAN CHARACTER  CHARACTER FIELD          PAGE.1  LINE.6

FIG. 11P

| BUSINESS-CARD MANAGEMENT | |
|---|---|
| COMPANY NAME | SYNYO DENKI KABUSHIKI KAISHA |
| FURIKANA | taro sanyo |
| NAME | ■ |
| ADDRESS OF COMPANY | |
| TEL | |
| FAX | |

```
|·········|·········|·········|·········|
         10   ▬    20        30        40
```

LATERALLY DOUBLED ROMAN CHARACTER  
FULL SIZE CHARACTER FIELD                PAGE. 1  LINE. 8

FIG. 11Q

| BUSINESS-CARD MANAGEMENT | |
|---|---|
| COMPANY NAME | SYNYO DENKI KABUSHIKI KAISHA |
| FURIKANA | taro sanyo |
| NAME | TARO SANYO■ |
| ADDRESS OF COMPANY | |
| TEL | |
| FAX | |

```
|·········|·········|·········|·········|
         10        20        30  ▬    40
```

LATERALLY DOUBLED ROMAN CHARACTER  
FULL SIZE CHARACTER FIELD                PAGE. 1  LINE. 8

FIG. 12

| NO | TYPE 1 | DATA LENGTH | LINE NUMBER | STARTING COLUMN NUMBER | FIELD NAME | CURSOR TYPE |
|---|---|---|---|---|---|---|
| 1 | CHARACTER | 44 | 4 | 9 | COMPANY NAME | 3 |
| 2 | CHARACTER | 40 | 6 | 9 | FURI-KANA | 1 |
| 3 | CHARACTER | 40 | 8 | 9 | NAME | 5 |
| 4 | CHARACTER | 62 | 10 | 9 | COMPANY ADDRESS | 3 |
| 5 | CHARACTER | 20 | 12 | 9 | TEL | 2 |
| 6 | CHARACTER | 20 | 14 | 9 | FAX | 2 |

```
CURSOR TYPE
   0:SUBSCRIPT(UPPER)
   1:SUBSCRIPT(LOWER)
   2:HALF-SIZE
   3:FULL-SIZE
   4:LATERALLY DOUBLED HALF-SIZE
   5:LATERALLY DOUBLED FULL-SIZE
   6:LONGITUDINALLY DOUBLED HALF-SIZE
   7:LONGITUDINALLY DOUBLED FULL-SIZE
   8:QUADRUPLE HALF-SIZE
   9:QUADRUPLE FULL-SIZE
```

FIG. 13A

OVERTIME MANAGEMENT TABLE

NAME:

| | OVERTIME WORK HOURS | TOTAL HOURS |
|---|---|---|
| MON. | | |
| TUE. | | |
| WED. | | |
| THU. | | |
| FRI. | | |
| SAT. | | |

10  20  30  40

CARD DEFINITION : CHARACTER NUMERIC DATE TABLE APPOINT. ☐  ☐ GRAPHIC ☐ ☐ ☐

FULL ROMAN SIZE CHARACTER          PAGE.1 LINE.3

FIG. 13B

OVERTIME MANAGEMENT TABLE

1988YEAR 12MONTH 12DAY~ 1988YEAR 12MONTH 17DAY

NAME:

| | OVERTIME WORK HOURS | TOTAL HOURS |
|---|---|---|
| MON. | | |
| TUE. | | |
| WED. | | |
| THU. | | |
| FRI. | | |
| SAT. | | |

10  20  30  40

CARD DEFINITION : CHARACTER NUMERIC DATE TABLE APPOINT. ☐  ☐ GRAPHIC ☐ ☐ ☐

FULL ROMAN SIZE CHARACTER          PAGE.1 LINE.3

FIG. 13C

```
          OVERTIME MANAGEMENT TABLE
          ▓1988YEAR 12MONTH 12DAY~ 1988YEAR 12MONTH 17DAY
                                      NAME:
```

|        | OVERTIME WORK HOURS | TOTAL HOURS |
|--------|---------------------|-------------|
| MON.   |                     |             |
| TUE.   |                     |             |
| WED.   |                     |             |
| THU.   |                     |             |
| FRI.   |                     |             |
| SAT.   |                     |             |

CARD DEFINITION: CHARACTER NUMERIC DATE TABLE APPOINT. ☐  ☐GRAPHIC ☐ ☐

FULL SIZE ROMAN CHARACTER                    PAGE.1  LINE.3

FIG. 13D

```
          OVERTIME MANAGEMENT TABLE
          ▓1988YEAR 12MONTH 12DAY~ 1988YEAR 12MONTH 17DAY
                                      NAME:
```

|        | OVERTIME WORK HOURS | TOTAL HOURS |
|--------|---------------------|-------------|
| MON.   |                     |             |
| TUE.   |                     |             |
| WED.   |                     |             |
| THU.   |                     |             |
| FRI.   |                     |             |
| SAT.   |                     |             |

DATE FIELD POSITION(AREA):  CHARACTER   HALF   2 CHARACTERS
DEFINITION              :   NUMBER      SIZE

FIG. 13E

| | OVERTIME MANAGEMENT TABLE | |
|---|---|---|
| | ▓▓▓▓▓▓▓▓▓▓▓▓▓ ~ 1988YEAR 12MONTH 17DAY | |
| | NAME: | |
| | OVERTIME WORK HOURS | TOTAL HOURS |
| MON. | | |
| TUE. | | |
| WED. | | |
| THU. | | |
| FRI. | | |
| SAT. | | |

DATE FIELD POSITION(AREA): CHARACTER  HALF   22 CHARACTERS
DEFINITION            NUMBER     SIZE

FIG. 13F

| | OVERTIME MANAGEMENT TABLE | |
|---|---|---|
| | NNNN YEAR MM MONTH DD DAY ▓ 1988YEAR 12MONTH 17DAY | |
| | NAME: | |
| | OVERTIME WORK HOURS | TOTAL HOURS |
| MON. | | |
| TUE. | | |
| WED. | | |
| THU. | | |
| FRI. | | |
| SAT. | | |

CARD DEFINITION: CHARACTER NUMERIC DATE  TABLE APPOINT.☐  ☐GRAPHIC ☐☐☐

FULL ROMAN SIZE CHARACTER                            PAGE.1  LINE.3

FIG. 13G

| | OVERTIME WORK HOURS | TOTAL HOURS |
|---|---|---|
| MON. | ■0HR. 30 MIN. | 100HR. 30 MIN. |
| TUE. | | |
| WED. | | |
| THU. | | |
| FRI. | | |
| SAT. | | |

OVERTIME MANAGEMENT TABLE
NNNN YEAR MM MONTH DD DAY ~ NNNN YEAR MM MONTH DD DAY
NAME:

CARD DEFINITION: CHARACTER NUMERIC DATE TABLE APPOINT. ☐   ☐ GRAPHIC ☐ ☐ ☐

FULL SIZE ROMAN CHARACTER          PAGE. 1   LINE. 3

FIG. 13H

| | OVERTIME WORK HOURS | TOTAL HOURS |
|---|---|---|
| MON. | ▨▨▨▨▨▨ | 100HR. 30 MIN. |
| TUE. | | |
| WED. | | |
| THU. | | |
| FRI. | | |
| SAT. | | |

OVERTIME MANAGEMENT TABLE
NNNN YEAR MM MONTH DD DAY ~ NNNN YEAR MM MONTH DD DAY
NAME:

DATE FIELD DEFINITION  POSITION(AREA):  CHARACTER NUMBER  HALF SIZE  14 CHARACTERS

FIG. 13I

| | OVERTIME WORK HOURS | TOTAL HOURS |
|---|---|---|
| MON. | NN HR. MM MIN.■ | 100 HR. 30 MIN. |
| TUE. | | |
| WED. | | |
| THU. | | |
| FRI. | | |
| SAT. | | |

OVERTIME MANAGEMENT TABLE
NNNN YEAR MM MONTH DD DAY ~ NNNN YEAR MM MONTH DD DAY
NAME:

CARD DEFINITION: CHARACTER NUMERIC DATE TABLE APPOINT. ☐  ☐ GRAPHIC ☐ ☐ ☐
FULL SIZE ROMAN CHARACTER          PAGE. 1  LINE. 3

FIG. 13J

| | OVERTIME WORK HOURS | TOTAL HOURS |
|---|---|---|
| MON. | NN HR. MM MIN. | NNN HR. MM MIN.■ |
| TUE. | | |
| WED. | | |
| THU. | | |
| FRI. | | |
| SAT. | | |

OVERTIME MANAGEMENT TABLE
NNNN YEAR MM MONTH DD DAY ~ NNNN YEAR MM MONTH DD DAY
NAME:

CARD DEFINITION: CHARACTER NUMERIC DATE TABLE APPOINT. ☐  ☐ GRAPHIC ☐ ☐ ☐
FULL SIZE ROMAN CHARACTER          PAGE. 1  LINE. 3

FIG. 14

| TYPE 2 | TYPE FORM | DISPLAY FORM |
|---|---|---|
| 01 | OOYEAR OOMONTH OODAY | YYYEAR MMMONTH DDDAY |
| 02 | SHOWA OOYEAR OOMONTH OODAY | SHOWA YYYEAR MMMONTH DDDAY |
| 03 | OOYEAR OOMONTH | NNYEAR MMMONTH |
| 04 | OOMONTH OODAY | MMMONTH DDDAY |
| 11 | OOO'CLOCK OOMIN. OOSEC. | HHO'CLOCK MMMIN. SSSEC. |
| 12 | OOO'CLOCK OOMIN. | HHO'CLOCK MMMIN. |
| 13 | OO : OO | HH : MM |
| 14 | OOHR. OOMIN. OOSEC. | NNHR. MMMIN. SSSEC. |
| 15 | OOHR. OOMIN. | NNHR. MMMIN. |
| 16 | OOMIN. OOSEC. | MMMIN. SSSEC. |

FIG. 15

| NO | TYPE 1 | DATA LENGTH | LINE NUMBER | STARTING COLUMN NUMBER | FIELD NAME | TYPE 2 | CURSOR TYPE |
|---|---|---|---|---|---|---|---|
| 1 | DATE | 22 | 4 | 36 | DATE 1 | 01 | 3 |
| 2 | DATE | 22 | 4 | 60 | DATE 2 | 01 | 1 |
| 3 | DATE | 14 | 8 | 20 | DATE 3 | 11 | 4 |
| 4 | DATE | 14 | 8 | 50 | DATE 4 | 11 | 3 |
| ⋮ | ⋮ | ⋮ | ⋮ | ⋮ | ⋮ | ⋮ | ⋮ |

FIG. 16A

| ARTICLE NAME | UNIT PRICE | AMOUNT | SUB-TOTAL |
|---|---|---|---|
|  | ▨00.000 |  |  |
|  |  |  |  |
|  |  |  |  |
|  |  |  |  |
|  |  |  |  |

TO:  ESTIMATE  1988 YEAR 12 MONTH 12 DAY

CARD DEFINITION: CHARACTER NUMERIC DATE TABLE APPOINT ☐ ☐ GRAPHIC ☐ ☐ ☐
FULL SIZE  ROMAN CHARACTER                              1st SHEET LINE 8

FIG. 16B

| ARTICLE NAME | UNIT PRICE | AMOUNT | SUB-TOTAL |
|---|---|---|---|
|  | ▨00.000 |  |  |
|  |  |  |  |
|  |  |  |  |
|  |  |  |  |
|  |  |  |  |

TO:  ESTIMATE  1988 YEAR 12 MONTH 12 DAY

NUMERIC FIELD POSITION (AREA) DEFINITION: CHARACTER NUMBER HALF SIZE 2 CHARACTERS

FIG. 16C

| ARTICLE NAME | UNIT PRICE | AMOUNT | SUB-TOTAL |
|---|---|---|---|
| | 100,000 | | |
| | | | |
| | | | |
| | | | |
| | | | |
| | | | |

TO:  ESTIMATE  1988 YEAR 12 MONTH 12 DAY

NUMERIC FIELD POSITION (AREA) DEFINITION : CHARACTER NUMBER HALF SIZE 14 CHARACTERS

FIG. 16D

TO:  ESTIMATE  1988 YEAR 12 MONTH 12 DAY

| ARTICLE NAME | UNIT PRICE | AMOUNT | SUB-TOTAL |
|---|---|---|---|
| | NNN.NNN | | |
| | | | |
| | | | |
| | | | |
| | | | |
| | | | |

CARD DEFINITION : CHARACTER  NUMERIC  DATE  TABLE APPOINT ☐   ☐ GRAPHIC ☐ ☐ ☐

FULL SIZE  ROMAN CHARACTER                    1st SHEET LINE 8

FIG. 16E

| ARTICLE NAME | UNIT PRICE | AMOUNT | SUB-TOTAL |
|---|---|---|---|
| | 1 2 | | |
| | | | |
| | | | |
| | | | |
| | | | |

TO:   ESTIMATE   1988 YEAR 12 MONTH 12 DAY

FULL SIZE   ROMAN CHARACTER   NUMERIC FIELD   1st SHEET LINE 8

FIG. 16F

| ARTICLE NAME | UNIT PRICE | AMOUNT | SUB-TOTAL |
|---|---|---|---|
| | 1 . 2 3 | | |
| | | | |
| | | | |
| | | | |
| | | | |

TO:   ESTIMATE   1988 YEAR 12 MONTH 12 DAY

FULL SIZE   ROMAN CHARACTER   NUMERIC FIELD   1st SHEET LINE 8

FIG. 24A

| ARTICLE NAME | UNIT PRICE | AMOUNT | SUB-TOTAL |
|---|---|---|---|

TO:

ESTIMATE   1988 YEAR 12 MONTH 12 DAY

CARD DEFINITION: CHARACTER  NUMERIC  DATE  TABLE APPOINT  ☐ GRAPHIC ☐ ☐

FULL SIZE  ROMAN CHARACTER   1st SHEET LINE 8

ESTIMATE    1988 YEAR 12 MONTH 12 DAY

| ARTICLE NAME | UNIT PRICE | AMOUNT | SUB-TOTAL |
|---|---|---|---|
| Xxxxxxxx | NNN,NNN | NNN,NNN | NNN,NNN |
| | | | |
| | | | |
| | | | |

C2

CARD DEFINITION: CHARACTER NUMERIC DATE TABLE APPOINT ☐ ☐ GRAPHIC ☐
FULL SIZE ROMAN CHARACTER    1st SHEET LINE 8

ESTIMATE          1988 YEAR 12 MONTH 12 DAY

▽▽▽ ▽▽▽ ▽ ▽ ▽ ▽ ▽ ▽ ▽ ▽ ▽ ▽

| ARTICLE NAME | UNIT PRICE | AMOUNT | SUB-TOTAL |
|---|---|---|---|
| X x x x x x | NNN , NNN | NNN , NNN | NNN , NNN |
|  |  |  |  |
|  |  |  |  |
|  |  |  |  |
|  |  |  |  |

△△△ △△△ △ △ △ △ △ △ △ △ △ △ △

10    20    30    40

C2

CARD DEFINITION : ☐ CHARACTER ☐ NUMERIC ☐ DATE ☐ TABLE APPOINT ☐ GRAPHIC

FULL SIZE  ROMAN CHARACTER                             1st SHEET LINE 5

ESTIMATE   1988 YEAR 12 MONTH 12 DAY

| ARTICLE NAME | UNIT PRICE | AMOUNT | SUB-TOTAL |
|---|---|---|---|
| Xxxxxxxx | NNN,NNN | NNN,NNN | NNN,NNN |
| | | | |
| | | | |
| | | | |
| | | | |

TABLE APPOINT : LINE REPEAT /// COLUMN REPEAT ///

FIG. 24E

ESTIMATE  1988 YEAR 12 MONTH 12 DAY

TO:

| ARTICLE NAME | UNIT PRICE | AMOUNT | SUB-TOTAL |
|---|---|---|---|
| X x x x x x x | NNN.NNN | NNN.NNN | NNN.NNN |
|  |  |  |  |
|  |  |  |  |
|  |  |  |  |

TABLE APPOINT : LINE REPEAT

ESTIMATE

TO:                                1988 YEAR 12 MONTH 12 DAY

| ARTICLE NAME | UNIT PRICE | AMOUNT | SUB-TOTAL |
|---|---|---|---|
| Xxxxxxxxxx | NNN,NNN | NNN,NNN | NNN,NNN |
| | | | |
| | | | |
| | | | |
| | | | |

TABLE APPOINT : LINE REPEAT

FIG. 24G

ESTIMATE  1988 YEAR 12 MONTH 12 DAY

TO:

| ARTICLE NAME | UNIT PRICE | AMOUNT | SUB-TOTAL |
|---|---|---|---|
| X x x x x x | NNN,NNN | NNN,NNN | NNN,NNN |
| X x x x x x | NNN,NNN | NNN,NNN | NNN,NNN |
| X x x x x x | NNN,NNN | NNN,NNN | NNN,NNN |
| X x x x x x | NNN,NNN | NNN,NNN | NNN,NNN |
| X x x x x x | NNN,NNN | NNN,NNN | NNN,NNN |

CARD DEFINITION: CHARACTER  NUMERIC  DATE  TABLE APPOINT ☐    ☐ GRAPHIC ☐

FULL SIZE  ROMAN CHARACTER                                1st SHEET LINE 5

FIG. 24H (Figure shows an "ESTIMATE" form dated 1988 YEAR 12 MONTH 12 DAY with columns: ARTICLE NAME, UNIT PRICE, AMOUNT, SUB-TOTAL. Labels include "TO:", reference numbers 24 and 25, and at the bottom "FULL SIZE HIRAKANA NUMERIC FIELD" and "1st SHEET LINE 8".)

FIG. 24I (rotated figure showing ESTIMATE form with columns: ARTICLE NAME | UNIT PRICE | AMOUNT | SUB-TOTAL, dated 1988 YEAR 12 MONTH 12 DAY, with TO: field and REGISTER: CONDITION WORD REGISTER, ABBREVIATION REFERENCE REGISTER INDEX)

FIG. 24J

| TO: | | ESTIMATE | | 1988 YEAR 12 MONTH 12 DAY | |
|---|---|---|---|---|---|
| | ARTICLE NAME | UNIT PRICE | AMOUNT | SUB-TOTAL | |
| | | | | | |
| | | | | | |
| | | | | | |

| FIELD NAME | TYPE | PROTECT | ENTER PROCESSING | PROCESSING DEFINITION | REFERENCE RETRIEVAL |
|---|---|---|---|---|---|
| 004 ▓▓▓▓ | N | | | | |
| 005 ARTICLE NAME 2 | C | | | | |
| 006 UNIT PRICE 2 | N | | | | |
| 007 AMOUNT 2 | N | | | | |
| 008 SUB TOTAL 2 | N | | | | |
| 009 ARTICLE NAME 3 | C | | | | |
| (SUB TOTAL 1 ) | | | | UPPER SCREEN: ▓▓▓▓ + ▓▓ | |

TO: ESTIMATE  1988 YEAR 12 MONTH 12 DAY

| | ARTICLE NAME | UNIT PRICE | AMOUNT | SUB-TOTAL |
|---|---|---|---|---|
| | | | | |
| | | | | |
| | | | | |

| | FIELD NAME | TYPE | PROTECT | ENTER PROCESSING | PROCESSING DEFINITION | REFERENCE RETRIEVAL |
|---|---|---|---|---|---|---|
| 004 | SUB TOTAL 1 | N | | ■ | | |
| 005 | ARTICLE NAME 2 | C | | | | |
| 006 | UNIT PRICE 2 | N | | | | |
| 007 | AMOUNT 2 | N | | | | |
| 008 | SUB TOTAL 2 | N | | | | |
| 009 | ARTICLE NAME 3 | C | | | | |

UPPER SCREEN : ▨▨▨ + ▨▨

FIG. 24L

| TO: | | ESTIMATE | | 1988 YEAR 12 MONTH 12 DAY | |
|---|---|---|---|---|---|
| ARTICLE NAME | | UNIT PRICE | AMOUNT | SUB-TOTAL | |
| | | | | | |
| | | | | | |
| | | | | | |

| FIELD NAME | TYPE | PROTECT | ENTER PROCESSING | PROCESSING DEFINITION | REFERENCE RETRIEVAL |
|---|---|---|---|---|---|
| 004 SUB TOTAL 1 | N | | ▨ | | |
| 005 ARTICLE NAME 2 | C | | | | |
| 006 UNIT PRICE 2 | N | | | | |
| 007 AMOUNT 2 | N | | | | |
| 008 SUB TOTAL 2 | N | | | | |
| 009 ARTICLE NAME 3 | C | | | | |

UPPER SCREEN : ▨ + ▨

TO:  ESTIMATE  1988 YEAR 12 MONTH 12 DAY

| ARTICLE NAME | UNIT PRICE | AMOUNT | SUB-TOTAL |
|---|---|---|---|
| | | | ■ C₂ |
| | | | |

| | FIELD NAME | TYPE | PROTECT | ENTER PROCESSING | PROCESSING DEFINITION | REFERENCE RETRIEVAL |
|---|---|---|---|---|---|---|
| 004 | SUB TOTAL 1 | N | | AUTOMATIC CALCULATION | | |
| 005 | ARTICLE NAME 2 | C | | | | |
| 006 | UNIT PRICE 2 | N | | | | |
| 007 | AMOUNT 2 | N | | | | |
| 008 | SUB TOTAL 2 | N | | | | |
| 009 | ARTICLE NAME 3 | C | | | | |

[OPERATIONAL DEFINITION] [ ■ ] ← C₃

ESTIMATE  1988 YEAR 12 MONTH 12 DAY

| ARTICLE NAME | UNIT PRICE | AMOUNT | SUB-TOTAL |
|---|---|---|---|
| | ■ | | |
| | | | |
| | | | |

| FIELD NAME | TYPE | PROTECT | ENTER PROCESSING | PROCESSING DEFINITION | REFERENCE RETRIEVAL |
|---|---|---|---|---|---|
| 004 SUB TOTAL 1 | N | | AUTOMATIC CALCULATION | | |
| 005 ARTICLE NAME 2 | C | | | | |
| 006 UNIT PRICE 2 | N | | | | |
| 007 AMOUNT 2 | N | | | | |
| 008 SUB TOTAL 2 | N | | | | |
| 009 ARTICLE NAME 3 | C | | | | |

[OPERATIONAL DEFINITION][UNIT PRICE 1 ■]

FIG. 24Q

TO:        ESTIMATE      1988 YEAR 12 MONTH 12 DAY

| ARTICLE NAME | UNIT PRICE | AMOUNT | SUB-TOTAL |
|---|---|---|---|
| | ■ | | |
| | | | |
| | | | |

| FIELD NAME | TYPE | PROTECT | ENTER PROCESSING | PROCESSING DEFINITION | REFERENCE RETRIEVAL |
|---|---|---|---|---|---|
| 004 SUB TOTAL 1 | N | | AUTOMATIC CALCULATION | | |
| 005 ARTICLE NAME 2 | C | | | | |
| 006 UNIT PRICE 2 | N | | | | |
| 007 AMOUNT 2 | N | | | | |
| 008 SUB TOTAL 2 | N | | | | |
| 009 ARTICLE NAME 3 | C | | | | |

[OPERATIONAL DEFINITION][UNIT PRICE 1 x ■]

FIG. 24R

| TO: | | | | | 1988 YEAR 12 MONTH 12 DAY | | |
|---|---|---|---|---|---|---|---|
| | | ESTIMATE | | | | | |
| | ARTICLE NAME | | UNIT PRICE | AMOUNT | SUB-TOTAL | | REFERENCE RETRIEVAL |
| | | | | ■ | | | |
| | | | | | | | |
| | | | | | | | |

$C_2$ points to AMOUNT cell

| FIELD NAME | TYPE | PROTECT | ENTER PROCESSING | PROCESSING DEFINITION | | | |
|---|---|---|---|---|---|---|---|
| 004 SUB TOTAL 1 | N | | AUTOMATIC CALCULATION | | | | |
| 005 ARTICLE NAME 2 | C | | | | | | |
| 006 UNIT PRICE 2 | N | | | | | | |
| 007 AMOUNT 2 | N | | | | | | |
| 008 SUB TOTAL 2 | N | | | | | | |
| 009 ARTICLE NAME 3 | C | | | | | | |

[OPERATIONAL DEFINITION][ UNIT PRICE 1 × AMOUNT 1 ■ ]

FIG. 24S

ESTIMATE  1988 YEAR 12 MONTH 12 DAY

TO:

| ARTICLE NAME | UNIT PRICE | AMOUNT | SUB-TOTAL |
|---|---|---|---|
| | | | |
| | | | |
| | | | |

| | FIELD NAME | TYPE | PROTECT | ENTER PROCESSING | PROCESSING DEFINITION | REFERENCE RETRIEVAL |
|---|---|---|---|---|---|---|
| 004 | SUB TOTAL 1 | N | EXECUTE | AUTOMATIC CALCULATION | UNIT PRICE 1 × AMOUNT 1 | |
| 005 | ARTICLE NAME 2 | C | | | | |
| 006 | UNIT PRICE 2 | N | | | | |
| 007 | AMOUNT 2 | N | | | | |
| 008 | SUB TOTAL 2 | N | | | | |
| 009 | ARTICLE NAME 3 | C | | | | |

OPERATIONAL EQUATION REPEAT : EXECUTE / NOT EXECUTE

ESTIMATE  1988 YEAR 12 MONTH 12 DAY

| ARTICLE NAME | UNIT PRICE | AMOUNT | SUB-TOTAL |
|---|---|---|---|
| | | | |
| | | | |
| | | | |

| FIELD NAME | TYPE | PROTECT | ENTER PROCESSING | PROCESSING DEFINITION | REFERENCE RETRIEVAL |
|---|---|---|---|---|---|
| 004 SUB TOTAL 1 | N | EXECUTE | AUTOMATIC CALCULATION | UNIT PRICE 1 × AMOUNT 1 | |
| 005 ARTICLE NAME 2 | C | | | | |
| 006 UNIT PRICE 2 | N | | | | |
| 007 AMOUNT 2 | N | | | | |
| 008 SUB TOTAL 2 | N | | | | |
| 009 ARTICLE NAME 3 | C | | | | |

ON PROCESSING

FIG. 24U

| FIELD NAME | TYPE | PROTECT | ENTER PROCESSING | PROCESSING DEFINITION | REFERENCE RETRIEVAL |
|---|---|---|---|---|---|
| 004 SUB TOTAL 1 | N | | EXECUTE | AUTOMATIC CALCULATION | |
| 005 ARTICLE NAME 2 | C | | | | |
| 006 UNIT PRICE 2 | N | | | | |
| 007 AMOUNT 2 | N | | | | |
| 008 SUB TOTAL 2 | N | | EXECUTE | AUTOMATIC CALCULATION | UNIT PRICE 2 × AMOUNT 2 |
| 009 ARTICLE NAME 3 | C | | | | |

ESTIMATE    1988 YEAR 12 MONTH 12 DAY

TO:

| ARTICLE NAME | UNIT PRICE | AMOUNT | SUB-TOTAL |
|---|---|---|---|
| | | | |
| | | | |
| | | | |
| | | | |
| | | | |

FULL SIZE  HIRAKANA  NUMERIC FIELD    1st SHEET LINE 8

FIG. 24X

| ARTICLE NAME | UNIT PRICE | AMOUNT | SUB-TOTAL |
|---|---|---|---|
| APPLE | 10▨ | | |
| | | | |
| | | | |
| | | | |
| | | | |

TO:   ESTIMATE   1988 YEAR 12 MONTH 12 DAY 10  20  30  40

FULL SIZE   ROMAN CHARACTER NUMERIC FIELD   1st SHEET LINE 8

FIG. 24Y

| ARTICLE NAME | UNIT PRICE | AMOUNT | SUB-TOTAL |
|---|---|---|---|
| APPLE | 100 | 25▨ | 0 |
| | | | |
| | | | |
| | | | |
| | | | |

TO:   ESTIMATE   1988 YEAR 12 MONTH 12 DAY 10  20  30  40

FULL SIZE   ROMAN CHARACTER NUMERIC FIELD   1st SHEET LINE 8

FIG. 24Z

| ARTICLE NAME | UNIT PRICE | AMOUNT | SUB-TOTAL |
|---|---|---|---|
| APPLE | 100 | 250 | 25,000 |
| ■ | | | |
| | | | |
| | | | |
| | | | |
| | | | |

TO:  ESTIMATE  1988 YEAR 12 MONTH 12 DAY

FULL SIZE   ROMAN CHARACTER   CHARACTER FIELD     1st SHEET LINE 10

FIG. 24Z-1

| ARTICLE NAME | UNIT PRICE | AMOUNT | SUB-TOTAL |
|---|---|---|---|
| APPLE | 100 | 250 | 25,000 |
| MANDARIN ORANGE | 20 | 50▨ | 0 |
| | | | |
| | | | |
| | | | |

TO:  ESTIMATE  1988 YEAR 12 MONTH 12 DAY

FULL SIZE   ROMAN CHARACTER   NUMERIC FIELD     1st SHEET LINE 10

| NO | 1 | 2 | 3 | 4 | 5 | ------ |
|---|---|---|---|---|---|---|
| STARTING COLUMN | 4 | 16 | 22 | 30 | FF | ------ |
| END COLUMN | 14 | 20 | 28 | 36 | | ------ |

| TYPE | 1 |
|---|---|
| STARTING LINE | 5 |
| STARTING COLUMN | 6 |
| END LINE | 17 |
| END COLUMN | 76 |

TYPE/0:NO REPEAT
1:LINE REPEAT 2:COLUMN REPEAT

FIG. 27

| NO | TYPE | DATA LENGTH | LINE NUMBER | STARTING COLUMN NUMBER | FIELD NAME | CURSOR TYPE | TABLE APPOINT | PROTECT | ENTER PROCESSING | PROCESSING DEFINITION |
|----|------|-------------|-------------|------------------------|------------|-------------|---------------|---------|------------------|----------------------|
| 1 | CHARACTER | 20 | 8 | 4 | ARTICLE NAME 1 | 3 | 1 | | | |
| 2 | NUMERIC | 14 | 8 | 26 | UNIT PRICE 1 | 2 | 1 | | | |
| 3 | NUMERIC | 14 | 8 | 40 | AMOUNT 1 | 2 | 1 | | | |
| 4 | NUMERIC | 14 | 8 | 56 | SUBTOTAL 1 | 2 | 1 | PROTECTED | AUTOMATIC CALCULATION | UNIT PRICE 1 ×AMOUNT 1 |
| 5 | CHARACTER | 20 | 10 | 4 | ARTICLE NAME 2 | 3 | 1 | | | |
| 6 | NUMERIC | 40 | 10 | 26 | UNIT PRICE 2 | 2 | ---- | ---- | ---- | ---- |
| ---- | ---- | ---- | ---- | ---- | ---- | ---- | ---- | ---- | ---- | ---- |
| 8 | NUMERIC | 14 | 10 | 56 | SUBTOTAL 2 | 2 | 1 | PROTECTED | AUTOMATIC CALCULATION | UNIT PRICE 2 ×AMOUNT 2 |
| ---- | ---- | ---- | ---- | ---- | ---- | ---- | ---- | ---- | ---- | ---- |

TABLE APPOINT/0:OUT TABLE, 1:INSIDE LINE REPEAT, 2:INSIDE COLUMN REPEAT

DATA PROCESSING APPARATUS AND METHOD FOR DEFINING SIZE AND TYPE OF DATA FIELD

BACKGROUND OF THE INVENTION

1. Field of the Invention

The present invention relates to a data processing apparatus with records comprising a plurality of fields, more particularly, it relates to a data processing apparatus which displays a card image and field data and processes the displayed data, and a field defining method used therein.

2. Description of Related Art

A conventional card image data processing apparatus is disclosed in Japanese Patent Application Laid-Open No. 59-68040 (1984). In the conventional apparatus, when fields in a card image is defined, there has been a problem that it is difficult to visually grasp a field display area. And, when the fields are defined by appointing the field display area and the types of field such as a numeric type, character type and the like, there has also been a problem that various keys are required for appointing the display area for every different type of field, which results in a poor operability of appointing the display area.

Furthermore, in the conventional apparatus, not only a predetermined appointing mark should be inputted to define the field area, the field character size definition was performed by an operation separate from display area appointment by the appointing mark, or the character size could not be changed as it is fixed.

In the card image data processing, since the field definition is usually repeated in the direction of a line or column, the operation of field definition is inefficient if it is repeated on each line or column. The repetitive defined contents also can be preferably displayed clearly to the operator.

SUMMARY OF THE INVENTION

The present invention has been devised in view of the situations aforementioned. Therefore, it is a primary object thereof to provide a data processing apparatus and a field defining method, whereby a field display area can simply be appointed similarly to operating a word processor and the field display area can easily be grasped visually.

It is another object of the invention to provide a data processing apparatus which is able to set the display size of field data being inputted to the fields, appoint a display area of the field data with a cursor of a set display size and readily define the display size and area of the field data.

It is a further object of the invention to provide a data processing apparatus, in which the defined contents can be confirmed easily by displaying a predetermined character according to the character type in a defined display area in the set display size.

It is a still further object of the invention to provide a data processing apparatus, in which the field definition in the direction of the line and column can be repeated simply by copying the contents displayed for the defined field in the direction of a line or column as the character data.

It is a still further object of the invention to provide a data processing apparatus in which the contents of field definition repeated in the direction of line and column can be confirmed easily by displaying the contents displayed for the defined fields in the direction of the line or column as the character data.

The above and further objects and features of the invention will more fully be apparent from the following detailed description with accompanying drawings.

BRIEF DESCRIPTION OF THE DRAWINGS

The embodiments of the invention will now be described with reference to the accompanying drawing,
FIG. 1 is a functional block diagram,
FIG. 6 is a schematic view showing the storage condition of recording data in a record memory,
FIG. 7 is a schematic view of a field management table,
FIGS. 11A through 11Q are schematic views of display screens of different conditions in the other cards,
FIG. 12 is a schematic view of a field management table,
FIGS. 13A through 13J are schematic views of display screens of different conditions in the other cards,
FIG. 14 is an explanatory view illustrating a type of time,
FIG. 15 is a schematic view of a field management table,
FIGS. 16A through 16F are schematic views of display screens of different conditions in the other cards,
FIGS. 24A through 24Z, 24Z-1, 24Z-2, and 24Z-3 are schematic views of display screens of different conditions in the other cards,
FIG. 27 is a schematic view of a field management table.

DESCRIPTION OF THE PREFERRED EMBODIMENTS

Figure 2A:
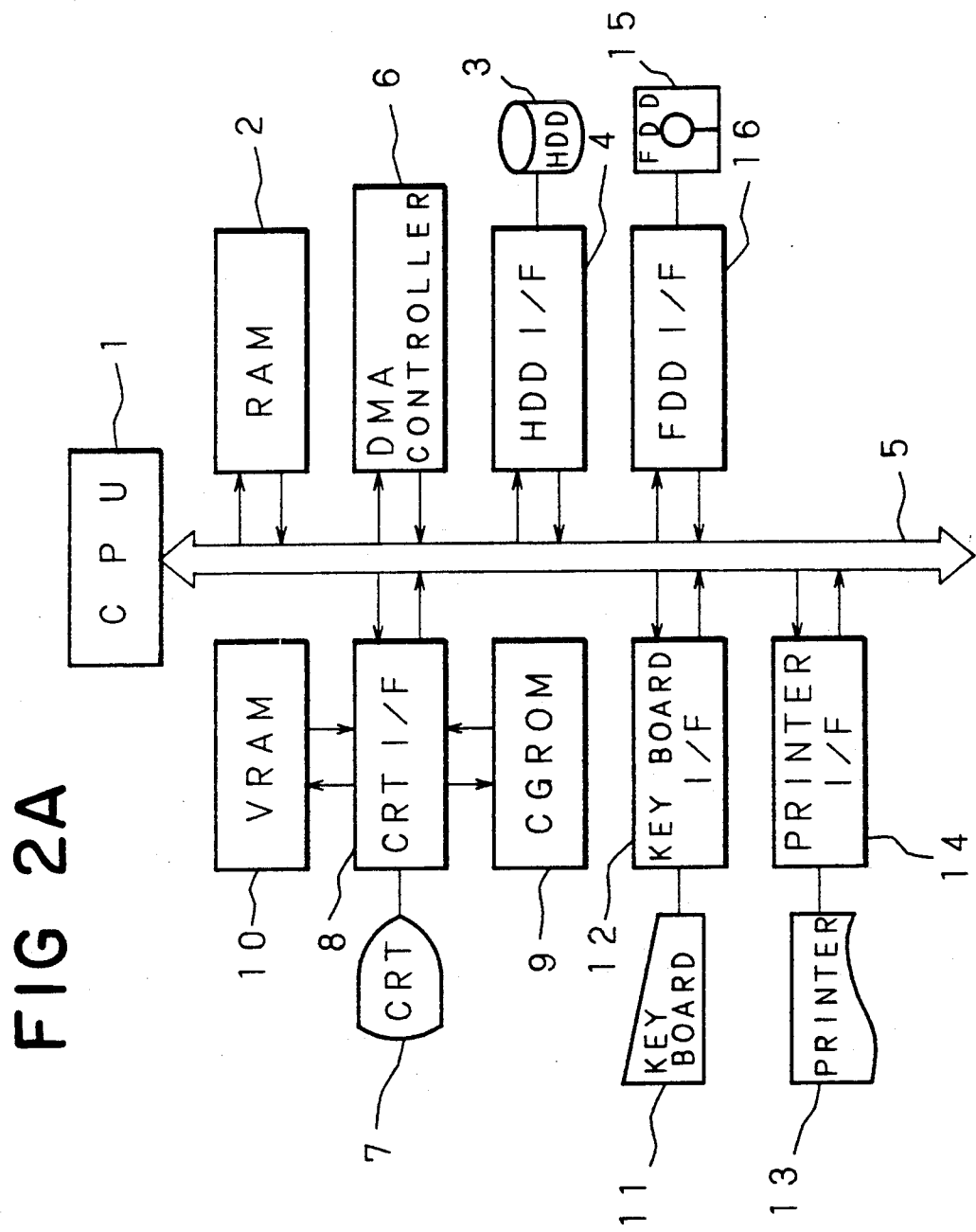
FIG. 2A is a system block diagram.
Figure 2B:
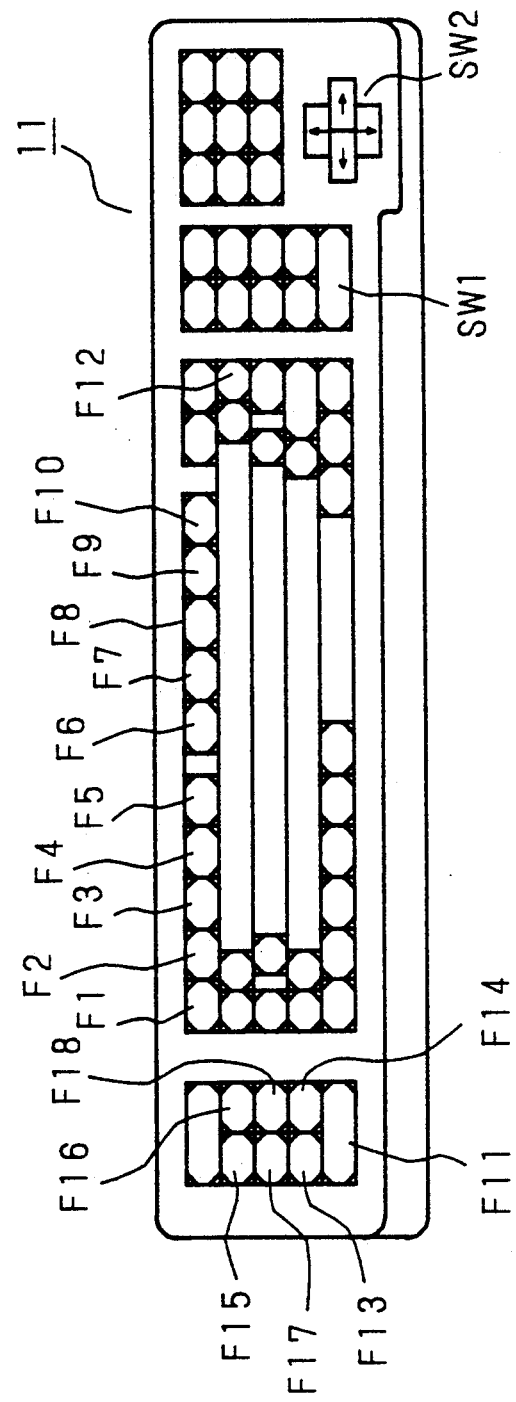
FIG. 2B is a plan view of portions of a keyboard,
FIG. 3(*a–b*) is a general flow chart.
Figure 3A:
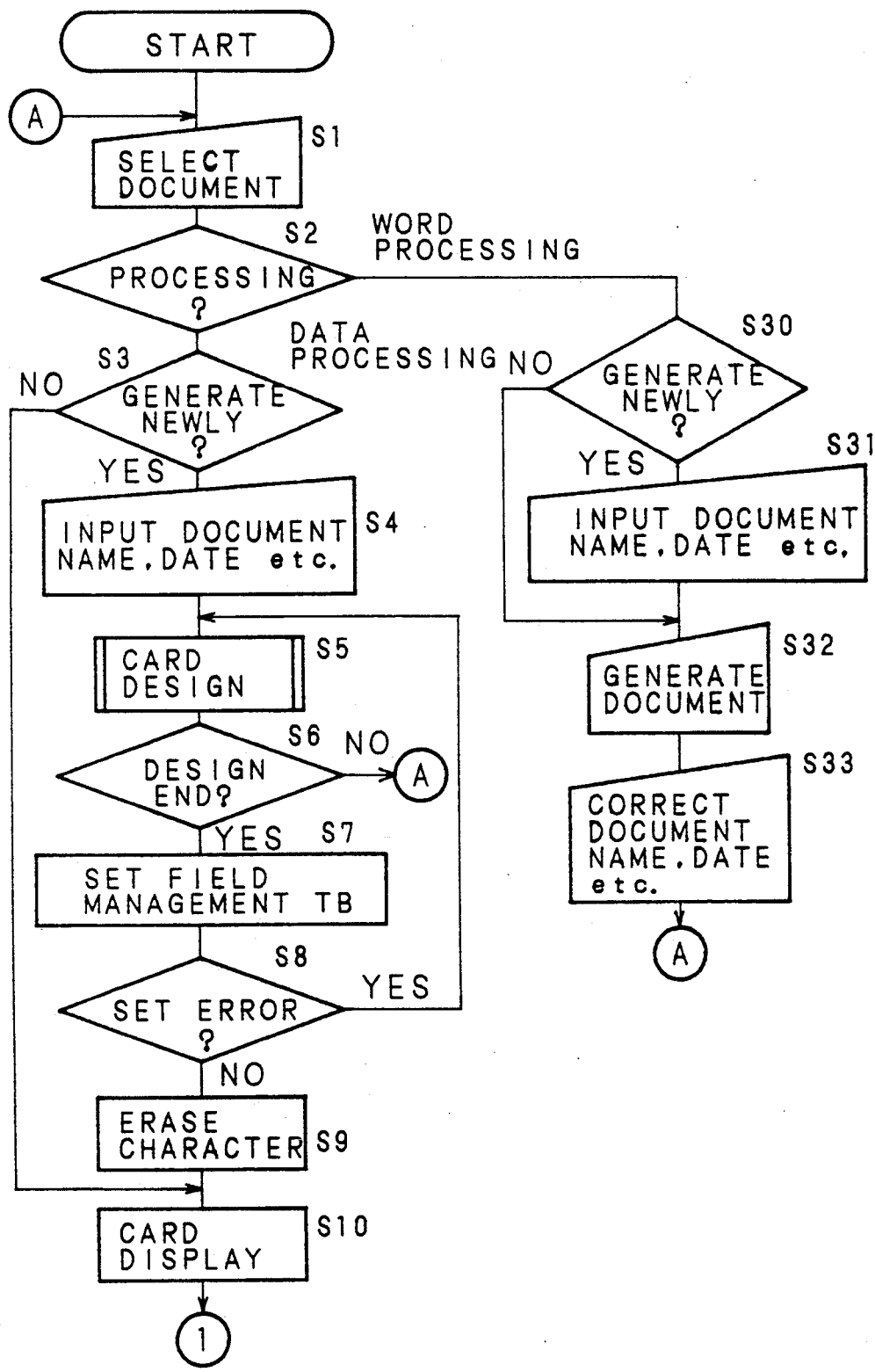
Figure 3B:
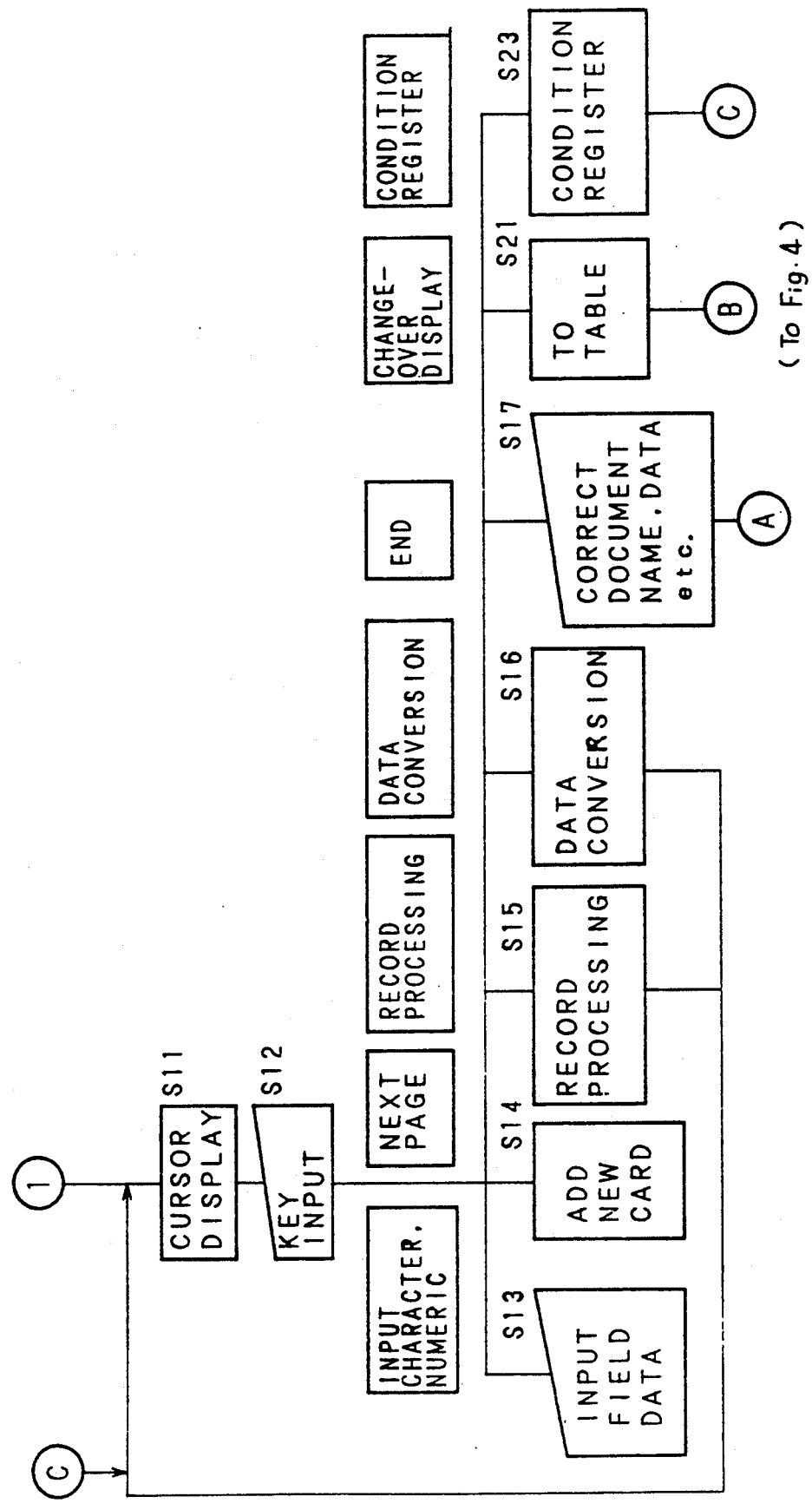

One embodiment of the present invention will be described with reference to the drawings as follows. An office processor which is a data processing apparatus of the present invention is capable of changing over a document processing mode functioning as a word processor to a data processing mode, in which recording data are inputted by the card display format for various data processings, such as sorting and selecting, and processed results are outputted in a card format and the like. The present apparatus comprises a system structure shown in FIGS. 2A and 2B and a functional block structure as shown in FIG. 1. In FIG. 2A, reference numeral 1 denotes a central processing unit (CPU) consisting of a microprocessor for controlling various input/output devices, document processing, data processing and the like. Reference numeral 2 designates a main memory consisting of a dynamic RAM for temporarily storing various programs, document files generated by the document processing mode, and data processing files generated by the data processing mode. Reference numeral 3 indicates a first auxiliary memory consisting of a hard disc drive connected to a bus 5 via a hard disc I/O interface 4. The hard disc I/O interface 4 includes a hard disc controller and controls a high speed data transfer between the main and auxiliary memories 2, 3 under control of a DMA controller 6 by an activation instruction from the CPU 1. Reference numeral 7 designates a CRT as a display unit which is connected to the bus 5 via a CRT interface 8. The CRT interface 8 includes a circuit for controlling the CRT 7 screen, and, under control of the CPU 1, changes displaying code data into a pattern by a character generator 9, and develops it on a display buffer memory 10 so as to display it on the CRT 7.

A key-board as an input unit for inputting the data, a text and the like and for selecting various functions is generally indicated by 11. The key-board 11 is connected to the bus 5 via a key-board interface 12 including a key-board control circuit. The key-board 11 has, basically, a key arrangement of a word processor being commercially available. As the arrangement of essential portions shown in FIG. 2B, the key-board 11 includes function keys F1 to F10 which vary according to the functional modes and fixed function keys F11, F12 . . . for selectively designating the functions. In addition, an execution key SW1, four-way cursor keys SW2, SW2 . . . and a group of numeric and character keys are provided thereon. The key-board interface 12 identifies a pressed key, converting it into the control signal and data signal and sends to the CPU 1, which receives the signals to execute various functions.

Reference numeral 13 designates a printer such as a laser beam printer, LED printer, thermal-transfer printer connected to a bus via a printer interface 14 which gives/receives print data which prints, for example, 48×48 dot matrix characters between the main memory 2 and a print buffer (not shown) of the printer 13. The CPU 1 controls the printing.

Reference numeral 15 designates a portable second auxiliary memory comprising a floppy disc drive connected to the bus 5 via a floppy disc interface 16. The second auxiliary memory 15 stores the document file and data file generated in the present apparatus and transferred from the first auxiliary memory 3, and the document file or the like generated in the other document processing units. The floppy disc interface 16 includes a floppy disc controller, and under control of the DMA controller 6 controls a high-speed data transfer between the main and second auxiliary memories 2, 15 by the activation instruction from the CPU 1.

FIG. 1 illustrates a functional block diagram of the apparatus of the invention having the aforesaid system configuration. That is, a control unit 17 corresponds to the CPU 1 and various programs indicating the control procedures of the CPU 1 stored in the main or first auxiliary memories 2, 3. A main memory unit 18 corresponds to the main memory 2, and an auxiliary memory unit 19 corresponds to the hard disc drive 3 and interface 4, and to the floppy disc drive 15 and interface 16. A display unit 20 corresponds to the CRT 7 and interface 8, and an input unit 21 corresponds to the keyboard 11 and interface 12. A printing unit 22 corresponds to the printer 13 and interface 14.

The control unit 17 forms various buffer memories M1 . . . and tables T1 . . . on the main memory unit 18. The control unit 17 executes the document filing function and data processing function with the buffer memories M1 . . . and tables T1 . . . by respective functional control units P2 to P5 to be realized by the various programs (softwares). Referring to the buffer and the table, M1 shows a text memory which stores image data (text data) of the text generated in the document processing mode and the card generated in the data processing mode. T1 designates a text management table wherein the number of pages and lines for managing the text data in the text memory (M1) and the page and line number being accessed are stored. M2 designates a record memory which stores a plurality of records comprising plural fields which have been inputted in the data processing mode. T2 shows a record management table which manages the number of records and fields and the number of the records and fields being accessed for managing the records in the record memory (M2). T3 shows a field management table wherein data for managing the field to which data are inputted in the data processing mode are stored. M3 shows various work buffers and registers used at various processings. M4 shows a program memory for storing the various programs. T4 designates a directory table in which data necessary for reading and writing the document file and data processing file on the first auxiliary memory 3 and the various programs are registered.

Referring to the control unit 17, P1 shows a main control unit which performs its basic function, whereby an input/output control unit P2, a file management unit P3, a document processing unit P4 and a data processing unit P5 are managed to be controlled.

The input/output control unit P2 controls an input unit 21, a display unit 20 and a printing unit 22, thereby giving and receiving control data as well as transferring character data between these units 21, 20, 22 and the main memory unit 18.

The file management unit P3 logically manages the files by using the data of the directory table T4 for accessing various files (document file, data file, dictionary file, font file, program file) registered in the auxiliary memory unit 19. In the directory table T4, there are included positional information of the file on the second auxiliary memory 15 composed for the data and document necessary when displayed by the document selector screen, for example in FIG. 5A, information on the number of composing files, and using state flags of each table.

The document processing unit P4 executes the function of a Japanese word processor. The document processing unit P4 includes a kana/Chinese character converting function which converts the characters inputted from the input unit 21 into the mixed characters of kana and Chinese character and various document editing functions. In addition, in order to simplify the editing, there are provided a functional control unit such as a document generating unit P41 fulfilling the document display function which displays the document being generated on a display, and a document printing unit which prints the edited document by the printing unit 22.

The data processing unit P5 comprises a card generating unit P51, a document generating unit P52, a record generating unit 53, a display-type management unit P54, a record processing unit P55, a data-conversion processing unit 56, and a form output processing unit P57. The document generating unit P52 has the same function as the document generating unit P41. The card generating unit P51 is provided with a function which generates a card image (card format) as shown, for example, in FIG. 5G when generating a new card using the function of the document generating unit P52, and a function which defines the field name, type and the like in the fields to which data are inputted and which sets the defining data in the field management table T3. The card image and management data are stored in the text memory M1 and the text management table T1, respectively. Then, by the document generating unit P52 having an access line pointer and an access column pointer indicating lines and columns which can be read (R)/written (W) from/to the text memory M1, R/W of the text memory M1 is performed by the pointers according to information of the text management table T1. The card generating unit P51 has a function to display the generated card of the selected data file when the card is not newly generated.

The record generating unit P53 displays input data from the key-board 11 in the field input area (defining display area) of the card generated by the card generating unit P51. The record generating unit P53 includes a writing (W) function which stores the input data in the record memory M2 and data for managing the record in the record management table T2, and a reading (R) function which reads the designated record from the record memory M2 so as to be composed with the card image to be displayed. The record generating unit P53 includes access record pointers which designate records capable of reading/writing.

The display form management unit P54 has a function which selects the record display in a one-record-one-card format (refer to FIG. 5K) or the display of plural records in a table format (refer to FIG. 5L).

The record processing unit P55 has various record processing (data processing) functions such as selecting and sorting the records. For example, in the case of selection, the record differing from the designated select condition is taken out from the processing object, and when the selection is released all of the records are returned to the processing object.

The data converting unit P56 has a function which converts the text data generated by the document generating mode into the record by the data processing mode and stores it as the data base.

The form output unit P57 has a function which buries the record generated by the data processing mode in the text data within the document file of the document generation.

Though respective functional control units P1, P2 . . . of the control unit 17 have been described, as previously stated these do not exist as hardware which can be extracted and separated but functionally as the softwares. These functional control units P1, P2 . . . are realized by the flow charts showing the outlines of processing procedures executed by the CPU in FIGS. 3 and 4. The functional control units P1, P2 . . . can be substituted by logic circuits and the like as required.

The basic operation and function of the apparatus of the invention will now be described mainly with reference to the flow charts of the control unit 17 shown in FIGS. 3 to 4 and the display screen shown in FIG. 5.

[A] Apparatus Activation and Document Selection

First, when a power is turned on, a document generating program is loaded and an initial screen shown in FIG. 5-1 is displayed on a display unit 20. In this example, as numbered on the left end, five files numbered from No. 1 to 5 have already been generated and stored in an auxiliary memory unit 19. File Nos. 1, 2 and 4 among the five files whose paper fields are in reverse video shown by a half tone ornament are data processing files generated by the data processing mode, and file Nos. 3 and 5 which are not video reversed are the files generated by the document generating mode. On the bottom of the screen, function keys corresponding to the function keys F1 to F10 on the top of the key-board 11 are displayed, and for example, F1 corresponds to the edition (generating document), and so does F6 to the data processing.

[B] Data Processing Mode Activation

Figure 5C:
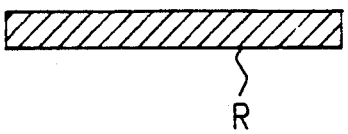
FIGS. 5A through 5R are schematic views of display screens of different conditions.

As described above, when the apparatus is activated, an initial screen of FIG. 5A is displayed. In the initial state, a lateral-line cursor C1 keeps the line No. 0 in reverse video to notify that the document No. 0 can be accepted to be newly generated. In this state, the document is selected according to Step S1 of FIG. 3. When a function key 6 for selecting the data processing from the menu on the bottom of the display screen is pressed by the operator so as to generate the document to be newly generated by the data processing mode, the processing goes to the data processing mode in Step S2. When the new document generation is identified in Step S3, the display screen is changed into those shown in FIG. 5B and a window demanding inputs of the document name, date and like is displayed in a lower right frame. When an execution key SW1 is pressed after inputting the document name, date and the like in the multi-window displayed in the lower right frame in such a way, the document generating program loaded hitherto is voided and the data processing program is loaded in place thereof. As a result, the data processing mode activates, the display screen changes into FIG. 5C, and the processing moves to the card generating routine in and after Step S5.

[C] Card Generating

A screen shown in FIG. 5C corresponds to a blank page of the document generating mode. A cursor C2 is movable in the blank page 1. By the character input and ruling by the input unit 21, a free input screen can be designed by the same operation as in the document generating mode with the function of the document generating unit P52. On the bottom of the display screen, a function key for appointing a data type (characters, numerics or date) of the field to be inputted is displayed. Designing of address cards comprising such four fields as name, address, telephone and age, will now be described with reference to FIG. 5D.

Figure 5D:
Figure 8:
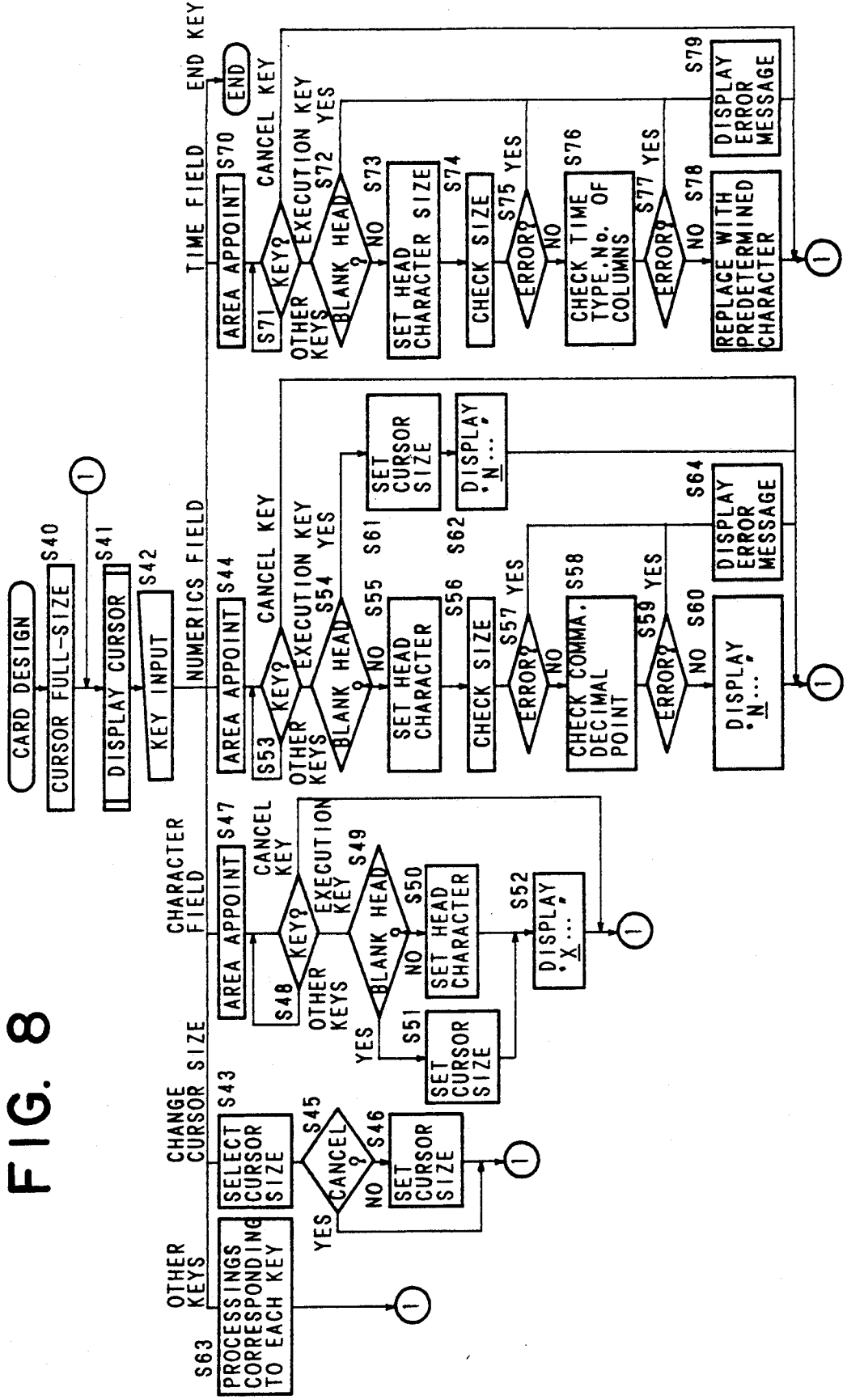
FIG. 8 is a flow chart of card design.
Figures 2, 24Z:
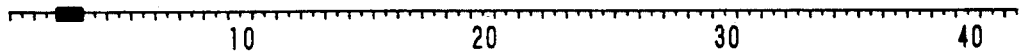
Figures 3, 24Z:
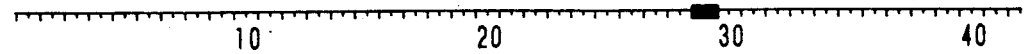

FIG. 5C shows the state wherein a cursor is set in full size in Step S5 of FIG. 3, that is, in a card design routine shown in FIG. 8 and then in Step S40, and shown in the set size (Step S41). FIG. 5D shows a display screen in the midst of the field position definition of "telephone" which follows the generation of card images consisting of the field names of "name", "address" and "telephone" by the function of the document generating unit P52 by inputs of a kana key a ruled line key in Step S42, and completion of the field position definition of "name" and "address". The definition of the "telephone" field will be described. First, while locating the cursor C2 at the field definition starting position of the "telephone" field, the function key F1 of the card definition: character is pressed. Here the processing moves to Step S43 and operates to move the cursor with a cursor key SW2. By this operation, as a "telephone" field shown in FIG. 5D, a character data input area R as a display area is indicated by the length of the cursor. At the same time, there is shown on the bottom of the screen that the input (definition) area has a capacity of 30 characters (calculated in half-size) as "character field position definition: the number of characters half-size 30 characters". In this case, as the cursor size is set in the full-size, it corresponds to the full-size 15 characters. Therefore, it may be indicated as "full-size 15 characters". In addition, in Step S43, by operating to move the cursor in the reverse direction, the display area can be decreased.

When the field position definition of the telephone, namely, the data input area and the number of characters indicated by the cursor are acceptable, the processing moves to Step S45 from S44 when an execution key SW1 is pressed. In Step S45, the cursor size is set in a cursor size register and the processing is moved to Step S46, wherein a set area R is attached with bright underlines Z and changed into the character "X" of the size being set in the cursor register (FIG. 5E).

In this state, 15 characters of "X" indicating the character data are shown and provided with the bright underlines Z thereunder. In data in the text memory M1, the character code data comprising 3 words of character like "X" (16 bits/one word, one word each for attributes such as the character size, JIS codes and the escape portion including luminance bits and character modifying information) are included, among which the luminance bit (1 bit) is set to "1". When the bit is "1", the bright underline Z is added to the displayed character and when it is "0", the bright underline Z is erased. In such a manner, the field position definition for the field name "telephone" is temporarily registered. In this state, by operating a character delete key (not shown) so as to delete characters "X" in series in the text in memory T1, the display area can be decreased. When a cancel key is pressed in Step S44, the processing returns to Step S41, and when the other key is pressed it remains in Step S44.

When the processing in Step S46 is finished, the processing returns to Step S41 and the cursor is moved to a desired position by operating a cursor keys SW2, SW2 .... Then, by the processing in Step S51, the card image portion of "age" is generated by the function of the document generating unit P52. Thereafter, the cursor C2 is positioned at the definition starting position of the "age" field. When a function key F2 of the card definition: numeric is selected, by the routine in Steps S48→S49→S50, the numeric field is defined provisionally as same as the routine in Steps S44→S45→S46. Different from Step S46, in Step S50, in lieu of "X" indicating that the displayed character is the character field, "N" indicates the numeric field.

When the respective fields are set and an end key F11 of the input unit 21 is pressed, as the screen shown in FIG. 5F, two function keys being inscribed in a large half-tone character are displayed on the right and left of the bottom of the screen. When either of the left-half keys F1 to F5 of the input unit is pressed, in Step S6 of FIG. 3, the end of card designing is determined and the processing is moved to a field management table setting routine in Step S7, wherein definition information for the respective fields are set in a field management table T3 as shown in FIG. 7 (details to be described later). When the field is not defined here, the table setting error is determined in Step S8 and the processing proceeds to Step S9 when there is no error. In the case where the presence of error is determined in Step S8, the processing returns to Step S5. When either of the function keys F6 to F10 is pressed in Step S6, the processing stops the card definition and returns to Step S1.

[D] Record Generating

Figures 5G, 5H:
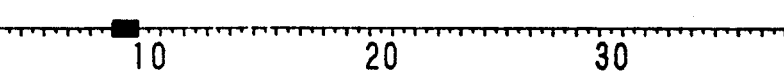

In Step S9, only the characters "X" and "N" with bright underlines Z on the display screen of FIG. 5F are erased and a blank card with only the field names are displayed in Step S10. In Step S11, the cursor C2 is positioned at the head of the first input field area. On the right bottom end of the screen, not only the position of the cursor but also the number of the card being inputted is displayed (FIG. 5G). During the data input, the cursor C2 may be moved only in the field area (area where X or N is present) set in the card designing, and the cursor size is automatically changed and set to the defined character size. In the character field, the Chinese character, kana and numerics can freely be inputted by the kana/Chinese character conversion, and the inputted characters are stored by a 16-bit JIS code. Meanwhile, in the numeric field only the numeric key of the input unit 21 is accepted, thus only a numeric string can be inputted. The numeric input data are stored by a 4-bit BCD code which is a code system different from the 16-bit JIS code.

When input of the respective fields are finished in Step S13, the display screen as FIG. 5H is shown. Here, when a next-page key F12 of the input unit 21 is pressed, page alignment takes place in the screen and a new blank card is displayed by the Step S14 as shown in FIG. 5I. The new card is indicated as the second card on the right bottom of the screen and the processing returns to Steps S11, S12, wherein the field data in the second card format is inputted as shown in FIG. 5J. By circulating processings of a loop of Steps S12→S13→S12→S14→S12→S13, the card type address book data of one-record-one-card can be generated in the desired number of cards. In this embodiment, the 12 sheets of card were prepared as shown to be "12th sheet" on the right bottom of the screen shown in FIG. 5K.

Figure 4:
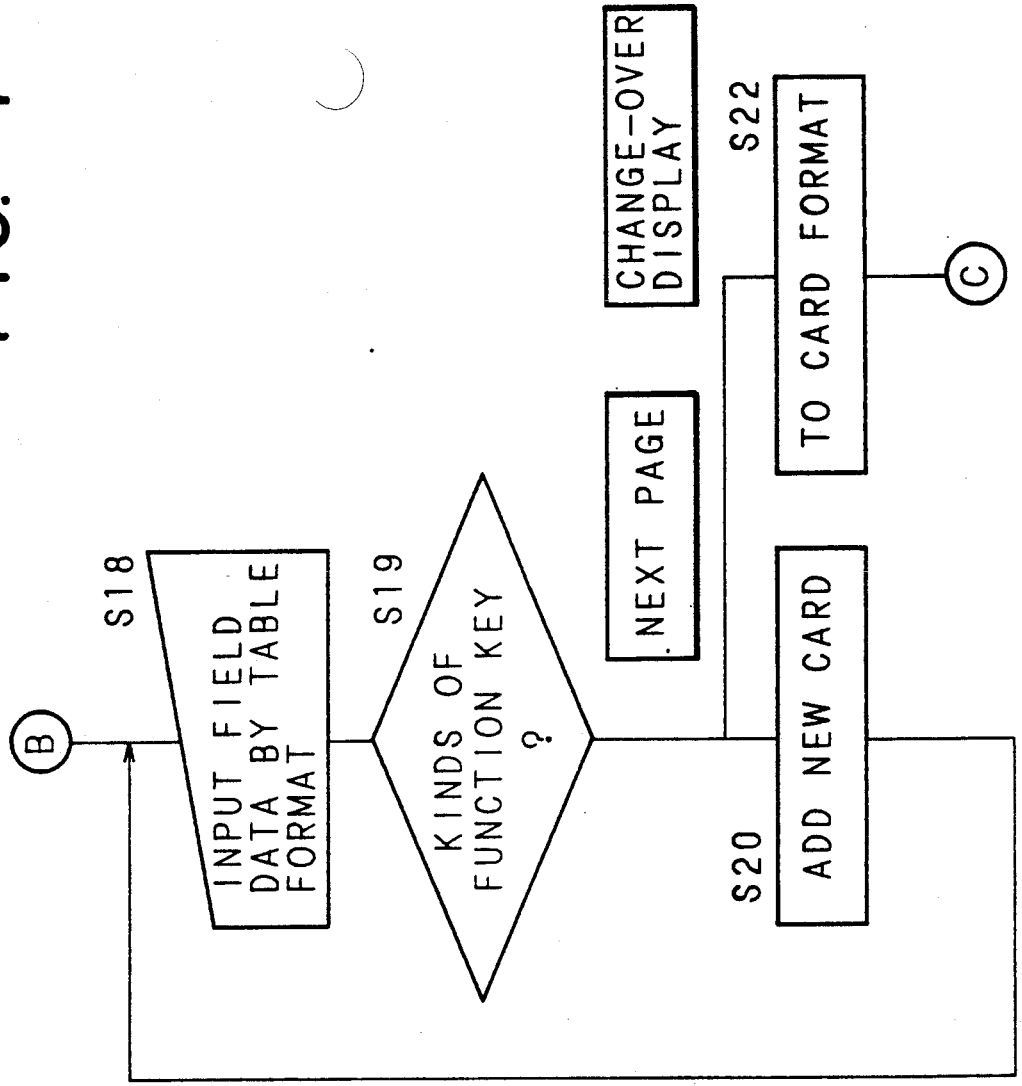
FIG. 4 is a flow chart of display change-over.

When a display change-over key F13 is pressed in Step S12, the processing moves to a flow shown in FIG. 4, and a display format management unit P54 is automatically changed over to a table display from the existing card format screen as shown in FIG. 5L (Step S21). FIG. 5M shows that the displayed fields of the table can be deleted and changed.

In the table display, input or correction of the field data is accepted in Step S18. When correcting, as shown in FIG. 5N, the cursor C2 is moved to a field data. When the cursor is moved, a character input field L1 is displayed on the bottom of the screen, then, the cursor may be moved to the field to be corrected and the right field data is inputted to the character input field L1 by the input unit 21 with the usual word processor touching.

The field thus being corrected is the same as the field data corrected in the card format regardless of the table display. That is, when the display change-over key F13 is pressed in Step S19, as shown in FIG. 5O, the screen returns to the card display format screen with corrected contents (Step S52).

When the next-page key F12 is pressed in Step S19, in Step S20 a field of card No. 13 is automatically added and displayed though not shown. By inputting the field data here, a new record (card) is added in the table display state.

[E] Record Processing

Next, returning to FIG. 3, the selective processing which performs condition retrieval will be described as an example of record processing in a data processing file comprising the inputted twelve records. When a select key F15 is pressed in Step S12, the screen changes as FIG. 5P and the processing is moved to Step S15 wherein the select condition is accepted. Then, on the bottom of the card display screen, the condition input picture is displayed. In a condition input field L2, "OSAKA *" is inputted from the input unit 21 by the word processor touching so as to retrieve the record whose address is Osaka. "*" indicates a front equivalence operator indicating that any character is accepted after the word Osaka is inputted. When the condition is inputted, the processing proceeds to Step S16 by pressing the execution key SW1 and the select processing is executed by the record processing unit P55.

In this embodiment there are five records which meet the aforementioned select condition. When tabulating this in a table, it is displayed as shown in FIG. 5Q by pressing the display change-over key F13 in Step S12. When the display change-over key F13 is not pressed, it can be checked one by one in the card format.

When the result of the select processing is not needed and all of the 12 input records are to be preserved, the select release key F16 is pressed to release the select. By pressing the end key F11 in Step S12, the screen in FIG. 5R is displayed and the name of document, author and date are displayed again in the window in Step S15. When the displayed contents are acceptable, the execution key SW1 is pressed. When not acceptable, the execution key SW1 is pressed after correcting and inputting the document name, date and the like to be corrected in Step S17. The data processing file of an "address book" is closed and the processing returns to Step S1. It is to be understood that a new data processing file can separately be generated only by the selected record without pressing the select release key F16. Besides the selection being executed in such a way, as the data processing, sorting and other conditional retrievals using logic operators such as AND, OR and so on are possible. For example, the retrieval by the conditional formula [address=Osaka Prefecture *] AND [age>30 years old].

[F] Configuration of Data Processing File

In one data processing file thus generated, the card images of "address book" are stored in a text memory M1 line by line as the serial character data, and a plurality of second data, each second comprising plural field data, are stored in a record memory M2 in such order of field as shown in FIG. 6. Information on the location of the card image where each record field is to be buried and the other defining information are stored in a field management table T3 as shown in FIG. 7.

[G] Detailed Description of Embodiments by Different Types of Cards (1) Field Position Definition by Setting the Cursor Size Optionally at Blank Ground The card where field definition is executed by setting the cursor size optionally at the blank ground will be described according to business card management cards shown in FIGS. 11A to 11M.

FIG. 11A shows a display screen whereon a card image is generated in Step S5 of FIG. 3 or in a card designing routine particularly in FIG. 8. That is, in Step S40, the cursor is set in the full size (initial value) and is displayed in that size in Step S41. Then, by inputting a KANA-key, a rule key and the like in Step S42, a card image is generated by the function of the document generating unit P52 (Step S63). Thereafter, the processing returns to Step S41 and displays the cursor C2 as shown in FIG. 11A.

When a function key F1 of the card definition: character is pressed after locating the cursor C2 first in the field definition starting position, the processing moves to Step S47 and the display screen changes to that shown in FIG. 11B in which the cursor is narrowed in half size. When the cursor is moved by the cursor keys SW2, a character data input area R is shown by the length of the cursor as shown in FIG. 11C. At the same time, on the bottom of the display screen, there is shown that the input (defining) area has a capacity of 44 characters as "character field position definition: number of characters, the half-size, 44 characters" (calculated by the half-size) (in this case since the cursor size is set in the full-size, it corresponds to the full-size 22 characters). It is also possible to display it in the full-size 22 characters.

When the field position definition of a company name or the data input area and the number of characters indicated by the cursor is acceptable, the processing proceeds to Step S49 from Step S48 when the execution key SW1 is pressed. Here, the front blank space is identified and the cursor size is set in a cursor size register in Step S51. Next, the processing moves to Step S52, wherein it is changed into a character "X" of the size being set in the cursor register and is provided with bright underlines Z throughout the set area R (FIG. 11D). In this state, 22 characters of "X" indicating the character data are displayed, each "X" being provided with the bright underline Z. In data in the text memory M1 at this time, the character code data comprising three words of character like "X" (16 bits/one word, one word each for attributes such as the character size, JIS codes and the escape portion including luminance and character modifying information) are included, among which the luminance bit (1 bit) is set to "1". When the bit is "1", the bright underline Z is added to the displayed character and when it is "0", the bright underline Z is erased. In such a manner, the field position definition for the field name of "company name" is temporarily registered. When a cancel key is pressed in Step S41, the processing returns to Step S41 to display the screen in FIG. 11A, and when the other key is pressed it remains in Step S48.

When the processing in Step S52 is finished, the processing returns to Step S41. In the display screen shown in FIG. 11D, when the cursor key SW2 is operated to position the cursor in the forefront of the data input area of a "furi-kana" field and a cursor size conversion key is pressed, the display screen is changed to that shown in FIG. 11F and the processing moves to Step S43. Here, the cursor sizes are displayed on the bottom of the screen in such a way to be corresponding to the function keys F1 to F8, displaying that selection of the sizes of superscript (1–4 full-size on the upper side), subscript (¼ full-size on the lower side), laterally doubled half-size (full-size), laterally doubled full-size, longitudinally doubled half-size, longitudinally doubled full-size, quadruple half-size (longitudinally quadruple half-size), quadruple full-size (longitudinally and laterally doubled full-size) are possible. When the function key F1 is pressed in Step S43 so as to select the "subscript" in the "furi-kana" field, the processing moves to Step S46, wherein the selected cursor size is set in the cursor size register and the processing moves to Step S41 to change the screen into FIG. 11G. When the card definition: character (function key F1) is pressed in Step S42, the processing moves to Step S47 to change the screen into FIG. 11H. When an area is appointed for the aforementioned "company name" by the cursor C2 as shown in FIG. 11I by the processing routine similar to the field definition and the execution key SW1 is pressed, the character "X" with the bright underlines Z of one fourth of the full-size is displayed (FIG. 11J).

Similarly, FIG. 11K shows the state wherein the field definitions of "name" field, "company address" field, "TEL" field and "FAX" field are temporarily registered. Since the state of field definitions is indicated and the character size and area are clear at a glance, the operator presses the end key F11 if those are acceptable. Then, in Step S6 of FIG. 3, an end of the card designing routine is identified. The processing, then, moves to the field management table set routine in Step S7, wherein the field defining information being temporarily registered in the text memory M1 in the card design routine is set in the field management in table T3.

Incidentally, when numerics are defined as the field definition in the card design routine, for example, if the function key F2 of card definition: numerics in the screen of FIG. 11A is selected, in the case of a blank ground presumptive definition of the numeric field is executed in the routine of Steps S44→S53→S54→S61→S62 similar to the routine of Steps S44→S48→S49→S51→S52. Different from Step S52, in Step S62 in lieu of "X" indicating that the displayed character is the character filed, the character "N" indicates the numeric field.

Figure 9:
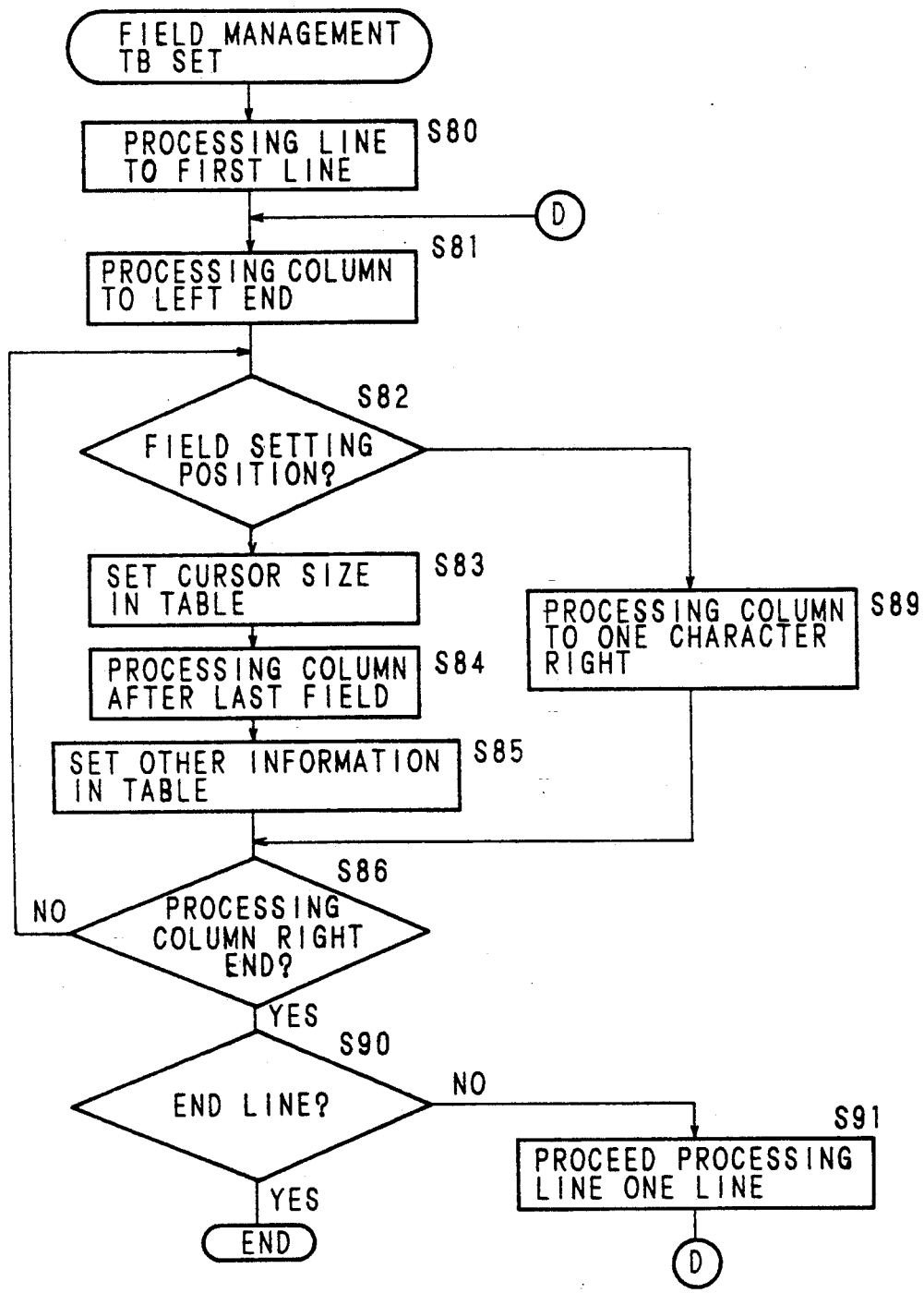
FIG. 9 is a flow chart of a field management table set.

The field management table set routine (details of Step S7) shown in FIG. 9 will now be described. In the text memory M1, text data as shown in FIG. 11K are stored, and the field defining conditions temporarily being defined are judged line by line and set in the field management table T3. That is, in Step S80, a line being processed is set in the first line, in Step S81, a column being processed is advanced to the utmost left, and in Step S82, it is determined whether or not the field set position. In an example shown in FIG. 11K, since there is no character with the bright underline Z, Step S82→Step S89 wherein the column being processed is advanced one character to the right→Step S86 wherein it is determined whether the column being processed is in the utmost right or not→Step S82 is repeated for one line. When this processing is finished it is identified in Step S90 whether the line being processed is the last line or not, and in Step S91, the line being processed is advanced one line downward and the processing returns to Step S81. The processing is, then, moved to the fourth line since there is no field set position in the second and third line.

When the column being processed in the 9th column in the fourth line, the bright line bit of characters "X" is discriminated in Step S82. In Step S83, "3" is set in the cursor type space of field No. 1 in the field management table T3 to indicate that the cursor is the full-size as shown in FIG. 12. Then, in Step S83, it is set in the type space that the field type is the "character". After advancing the column being processed to the next of the last column of the processing field in Step S84, the other information are set in the field management table T3 in Step S85. That is, as the column starting position the column starting position "9" being stored is set in Step S82, as the line position, the line position "4" being stored is set in Step S80, as the data length, a count value is set in Step S84, and as the field name, character data being located at the left-hand side of the field starting column position is read and set. At this time, when the character data can not be decoded, the character data corresponding to the field No., for example, "character No. 1" is automatically stored.

When the field management table set of field No. 1 has been processed in such a way, whether the field set position is preset on the right of field No. 1 on the fourth line or not is detected by such a flow as Steps S86→S82→S89→S86. If it is present, the same processing is executed as field No. 2. In this embodiment, since there is no field set position, the processing column is advanced to the utmost right of one line and indicating YES in Step S86, thus the processing moves in such order as Steps S90→S91→S81 and the fields on and after the 5th line are set in the field management table T3. As a result, the field management data of field Nos. 2 to 6 are set as shown in FIG. 12.

Incidentally, while the field management table setting routine is executed, the display screen is in the state shown in FIG. 11K. In lieu of displaying the card definition on the bottom of the screen, however, the order of lines and columns to be processed are displayed at a real time together with the display "field under definition" to notify the operator that the processing is on progress.

When the field management table set is finished, the processing moves to determination processing Step S8 of the table set in FIG. 3, wherein it is determined that there is an error if field setting is not performed at all, and the processing is returned to the card design in Step S5 to demand the field definition to the operator. When there is no table set error in Step S8, the processing moves to Step S9, wherein the characters "X" with bright underlines in FIG. 11K are erased and the card screen is displayed as shown in FIG. 11L in Step S10. In this case, a blank card is displayed as it is just after the card definition. When the data processing file is not newly generated, in Step S3 a first card in which data of each field and the card format image data are composed is displayed in Step S10. In Step S11, the cursor C2 is displayed on the card. That is, in the flow chart of FIG. 10, the size data is read from the cursor type space of the field management table T3 in Step S100, and the cursor C2 according to the read size is displayed on the screen in Step S101. The initial set position of the cursor is a head column of field No. 1 (FIG. 11L) and is in the field data input wait state.

Though the field data input is omitted as it has already been described, a cursor moving area is limited to the field set position, that is, the displayed area of the character "X" of FIG. 11K. FIG. 11M shows the data input progress. Incidentally, when the data input field type is that of the character in Step S13, it is determined from the field management table T3 that the type is of the character to allow the conversion of the cursor key when a cursor size conversion key is pressed, and when the field type is the numerics and date, depression of the cursor size conversion key is not accepted. Though the size conversion in the character field can freely be made in both of the right and left directions, the conversion in the vertical direction is adapted to be properly displayed by enabling the size conversion in the reducing direction. By employing such configuration, it is possible to input the character field in relatively free size and to store it in the record memory for display. Meanwhile, since it is not preferable to change sizes within the same field area for the numeric and date fields, the size conversion is not accepted. Thereby, the data input familiar to the user is available. When data are inputted by changing the character size from the half-size to the full-size, the number of input characters is that of one half of the half-size and the input of them is impossible beyond that.

(2) Field Position Definition by Displaying Characters in a Ground

① Time (Date) Field Definition

Figure 10:
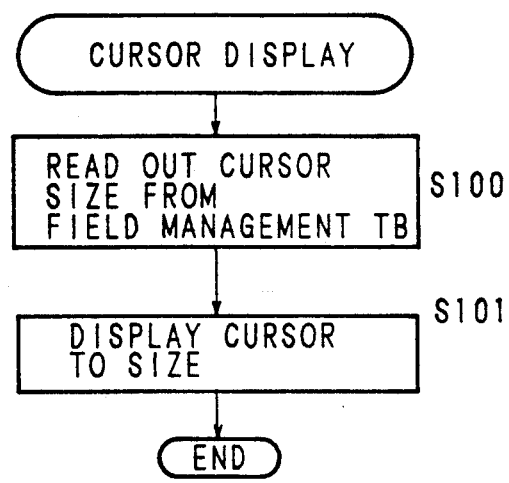
FIG. 10 is a flow chart of cursor display.

The case where the time field definition is selected in Step S42 in the card design routine of FIG. 8 will be described according to the display screens of FIGS. 13-1 through 13-10. FIG. 13-1 shows the state wherein a overtime management table card image is generated in the card design routine, and the wait condition of key input in Step S42. It is generated by the document generating unit P52 by moving the cursor C2 to a position where the time field is to be defined (FIG. 13A) and by inputting a ground being applied with a suitable numeric character with a key (FIG. 13B). Next, when the head cursor C2 of the ground is advanced (FIG. 13C) and the function key F3 of card definition: time is pressed, the processing is moved to area appointing Step S70 and the screen changes to that shown in FIG. 13D. Here, the area of defining position is appointed by pressing a right-shifting key of the cursor key SW2 to expand the cursor black reverse zonally to the date and by releasing the depression of the cursor key (FIG. 13E). The area can be appointed only by depressing the cursor key. When this area appointment is accepted, by pressing the execution key SW1 by the operator, it is determined YES in Step S71 and whether the forefront is blank is determined in Step S72. In this case, since the forefront is "1" and is not blank, the character size of "1" is determined in Step S73, and "full-size" information is set in a character size buffer. In Step S74, whether the character of different size is present in the appointed area or not is checked. When there is the character of different size as a result of the size check in Step S79, that is determined as error, of which case an error message is displayed on the screen in Step S79. When there is no character of different size, the processing moves to Step S76, wherein a type of time and the number of columns are checked and the error is checked in Step S77. When there is an error, similarly to the aforementioned size check an error message is displayed in Step S79. When there is no error, the processing moves to Step S78 and the characters with bright lines Z are displayed (FIG. 13F). When the forefront of the characters is three columns or more, it is indicated as "N N . . . ", when two columns "Y Y" comes before the year, "M M" before the month, "D D" before the date, "H H" before the o'clock, "M M" before the minute, "S S" before the second and "N N" before the hour, which are set in the text memory M1 and displayed. At this time, the bright line bit of each character is set to "1" as aforementioned and displays the character with bright underline Z, and then, the processing returns to Step S41.

When the forefront is blank in Step S72, the processing moves to Step S79 to output the error message therein and it returns to Step S41. That is, it means that the ground must be generated in the case of time field definition, and the cursor must be located at the forefront of the ground before entering the field definition.

In this respect, in the case of character field position definition, when the processing enters definition: execution in the state wherein the ground is formed and the cursor is located at the forefront thereof, in Steps S48→S49→S50 of FIG. 8, the head character size is stored in Step S50 and the character "X" is displayed at the stored size in Step S52. When the processing enters the defining execution in the state wherein the ground is not formed, or the cursor is located at the blank portion even when the ground is formed, the processing is executed as Steps S48→S49→S51→S52 and the error does not occur. This applies to the case for the numeric field definition to be described later.

When the same defining processing is executed on the ground "1988, 12, 17" the screen changes to that shown in FIG. 13G. Since the same processings as the aforementioned definition of date are executed for defining the overtime and total working hours, detailed description will be omitted. By appointing the area (FIG. 13H) and depressing the execution key SW1 after suitably generating the ground as shown in FIG. 13G, the definition is executed (FIGS. 13I, 13J). The time definitions of field Nos. 1(#) to 4(#) are executed in such a manner. Likewise, the time definition of Tue. to Sat. can similarly be executed. In this case, when "N N hours M M minutes" are written in Tue. to Sat. in the overtime field, it is also possible to store temporarily the "N N hours M M minutes" data and use the copying function of a document generating unit P52 in which the data is copied.

When the respective time fields are defined, the field management table set routine in Step S7 is executed similarly as aforementioned, and in the field management table T3, management information are set with the contents as shown in FIG. 15. Points different from the case of character field definition of FIG. 12 are that, the time is set in the type field, the field names such as the time 1, 2 . . . are automatically set in the field name field, and information indicating the types of time such as "01" and "11" (refer to FIG. 14) are set in the type 2 field. By storing this type of time, only the portion designated by ∞ in FIG. 14 may be stored as the record, and it is possible to compose and display the time data by reading out the type at the time of card display.

② Numeric Field Definition

An example of defining the numeric fields after generating the ground will be described according to estimation cards in FIGS. 16A to 16F. Though basically the same processing as the character field explained by FIG. 11 is performed, a different point from that is that there are provided a check step for checking whether the character of different size is present or not in an appointed area, and that a check step for checking whether commas and decimal points are properly marked or not. Processing contents will be described below with reference to the display screen.

FIG. 16A shows the state wherein the ground 100,000 is inputted in a "unit price" field and the cursor C2 is located on "1" so as to appoint an area. Here, when the function key F2 of card definition: numerics is depressed, the screen changes to that shown in FIG. 16B. When the cursor key is operated to appoint the area (FIG. 16C) and the execution key SW1 is pressed, the processing moves from Step S54 to S55. A size data register of the head character is set in Step S55, and in Step S56, it is checked whether the character different from the head size is present within the appointed area. A resultant check error is determined in Step S57, and in the case where there is an error, an error message is displayed on the screen in Step S64, returning the processing to Step S41 and asking the operator for correction. Though there is also a method of unifying the size by the head character without such size checking, when the size is changed on the way of the operation since the operator does not necessarily desire the definition by the head character size, such a checking method is more effective.

When there is no error in Step S57, the processing moves to Step S58 to check the comma and decimal point error. Checking is performed on whether two or more decimal points are included within the appointed area, or the commas are provided every three columns or the comma is marked after the decimal point. When there is an error in Step S9, the error message is displayed in Step S64, and when there is no error, the processing moves to Step S60, wherein the comma within the appointed area and the characters other than the decimal points are replaced by "N" (FIG. 16D) and the processing is returned to Step S41 for processing the next field.

Since the processings on and after Step S7 are the same as the aforementioned they are omitted here, but in a field data input step in Step S13, for example, when numerics are inputted in the unit price field, they are displayed from the last position of the field, and commas (information of the comma and decimal point are stored in the field management table T3 in Step S84) are automatically marked (FIGS. 13E and 13F). Also, in this numeric field the character size is unified within the appointed area, thus the cursor size conversion key can not be depressed and it is limited to a predetermined character size input according to the cursor size set in the field management table T3.

[H] Detailed Description of Another Embodiment by Another Type of Card (1) Line Repeat of Field Definition in Table In the present apparatus, in a table surrounded by ruled lines as shown in FIG. 24A, a line repeat function which repeats the field position definition longitudinally (line) and a column repeat function which repeats in the right and left directions (column) for such field names as "article name", "unit price", "quantity" and "sub-total" are involved. In the following, these functions and their executing means will be described.

Figure 24M:
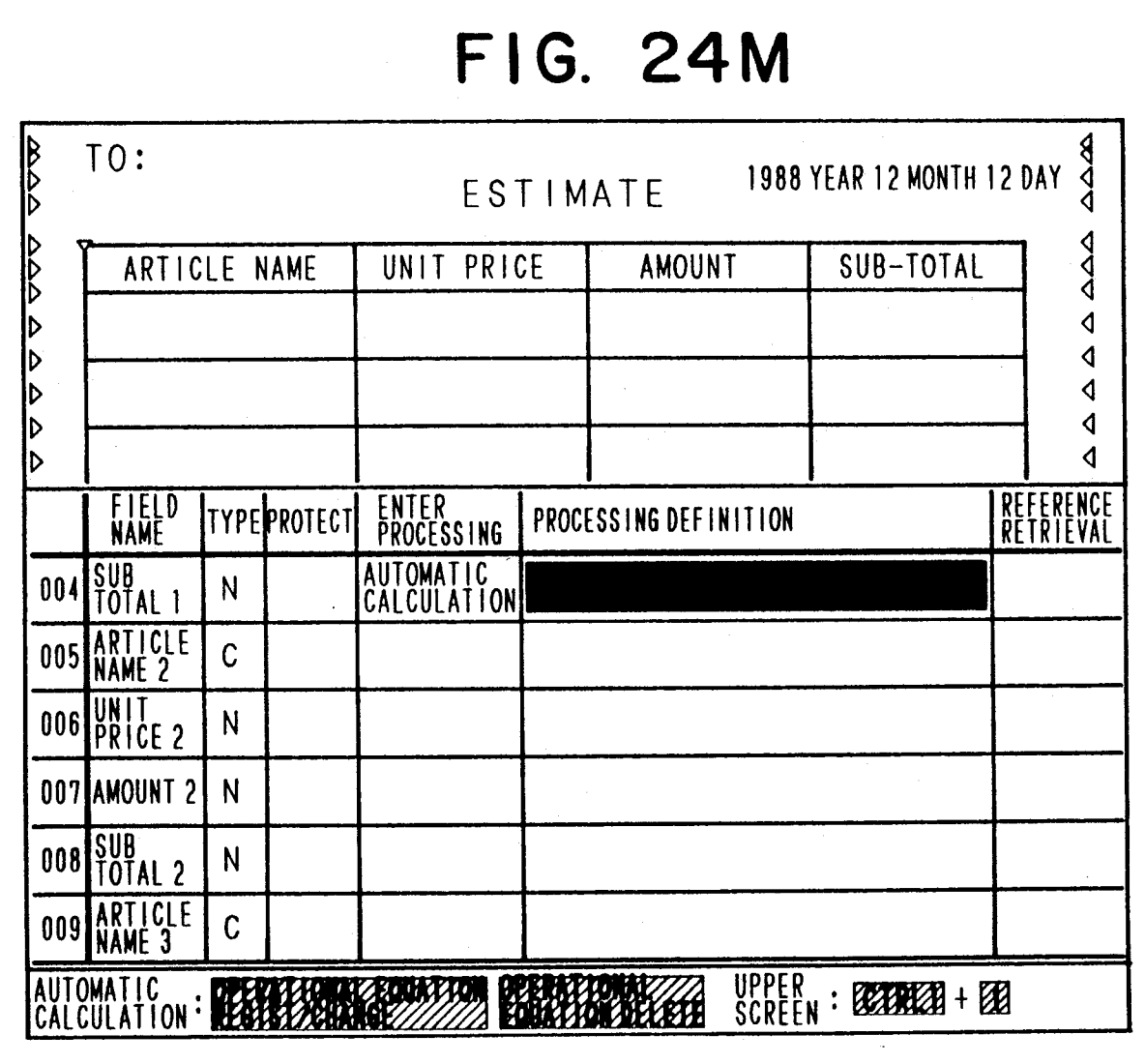
Figure 24V:
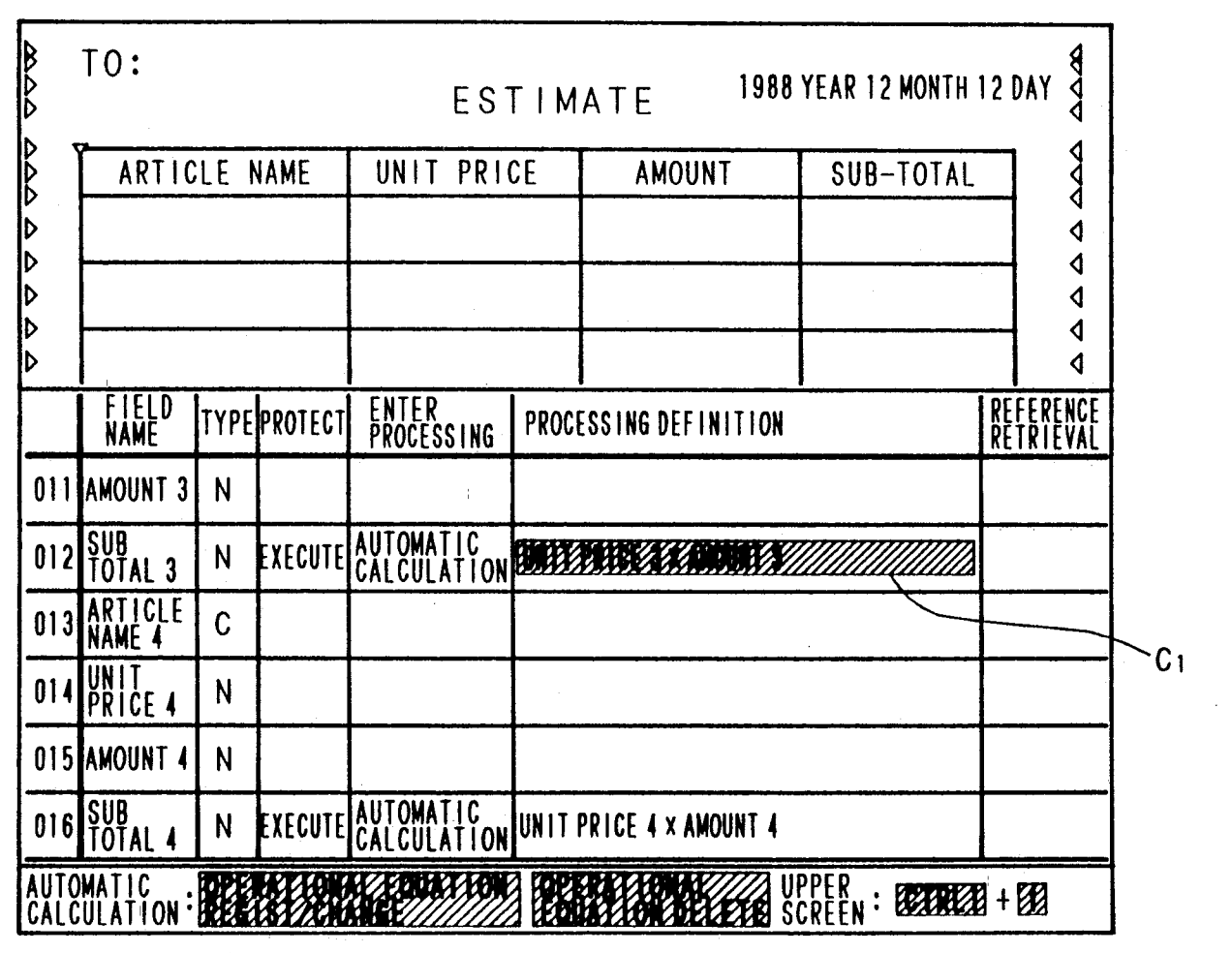
Figure 17:
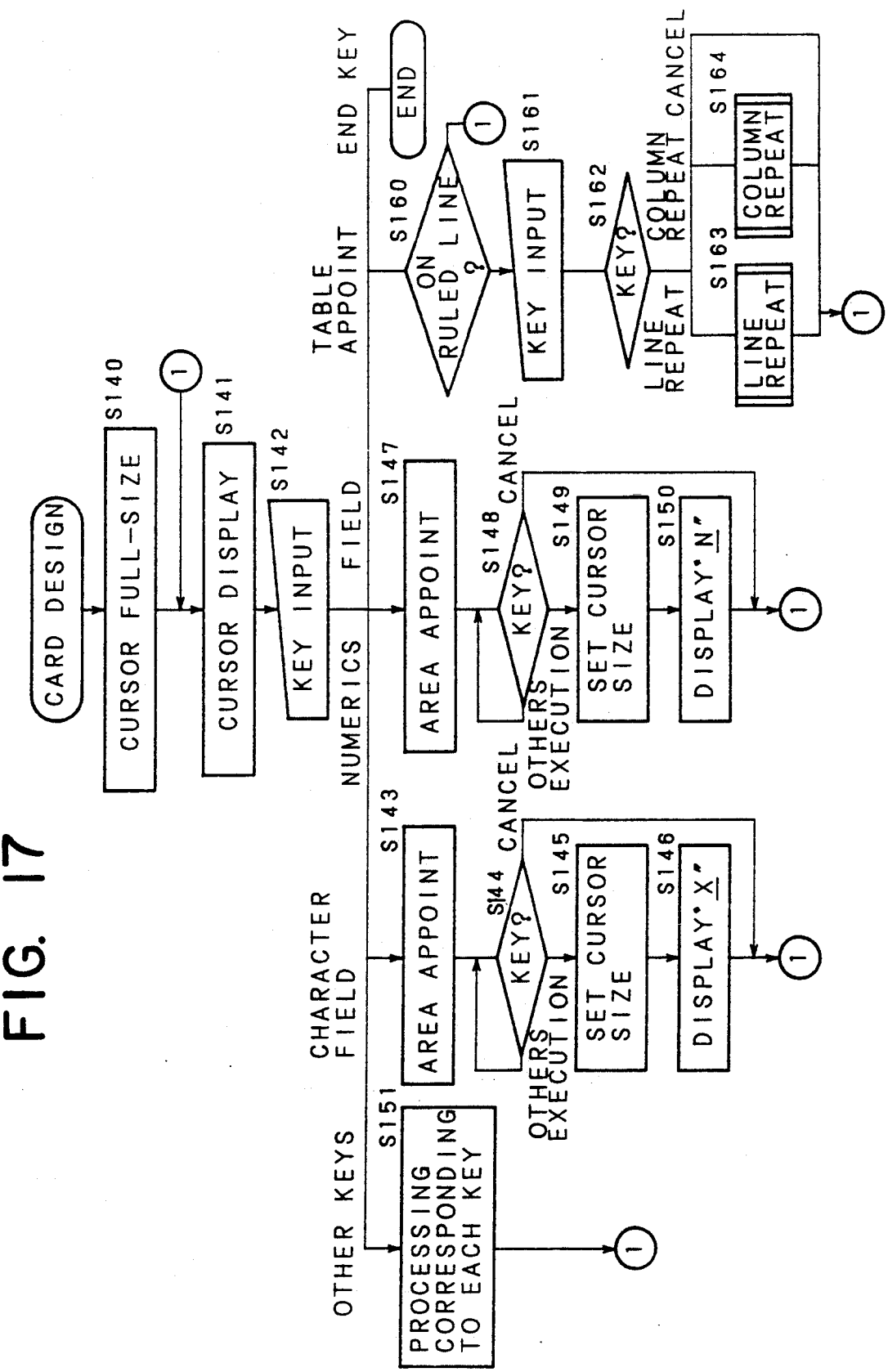
FIG. 17 is a flow chart of card design of another embodiment.

FIG. 24A shows a display screen of the state wherein a estimation card image is generated in Step S5 of FIG. 3, that is, in a card design routine of another embodiment of FIG. 17.

Likewise, FIG. 24B shows the state wherein the field position definition of the respective fields of the article name, unit price, quantity and sub-total is executed in the same procedures as explained in FIGS. 5A through 5E. Here, when the definition of each field is not necessary to be changed downward (in the direction of line), it is not necessary to repeat the same operation on each line but the line repeat function of the field position definition can be used.

That is, in Step S142 of FIG. 17, as shown in FIG. 24C, the cursor C2 is moved to the upper left end of the table (the line of field name may be included or not be included, may be in the left end of the defined line), and a function key F4 of card definition: table appoint is pressed. Then, the processing will move to Step S160 wherein it is determined whether the cursor is on the intersecting point of the longitudinal and lateral ruled lines. In the case of YES, the processing moves to Step S161, wherein the screen changes to that shown in FIG. 24D and the line repeat and the column repeat are displayed on the bottom of the screen so as to wait to be selected (Step S162). In this case, when either of the function keys F1 through F5 is pressed to effect the line repeat, the processing moves to the line repeat processing in Step S163 from Step S162 (FIG. 24E).

Figure 18:
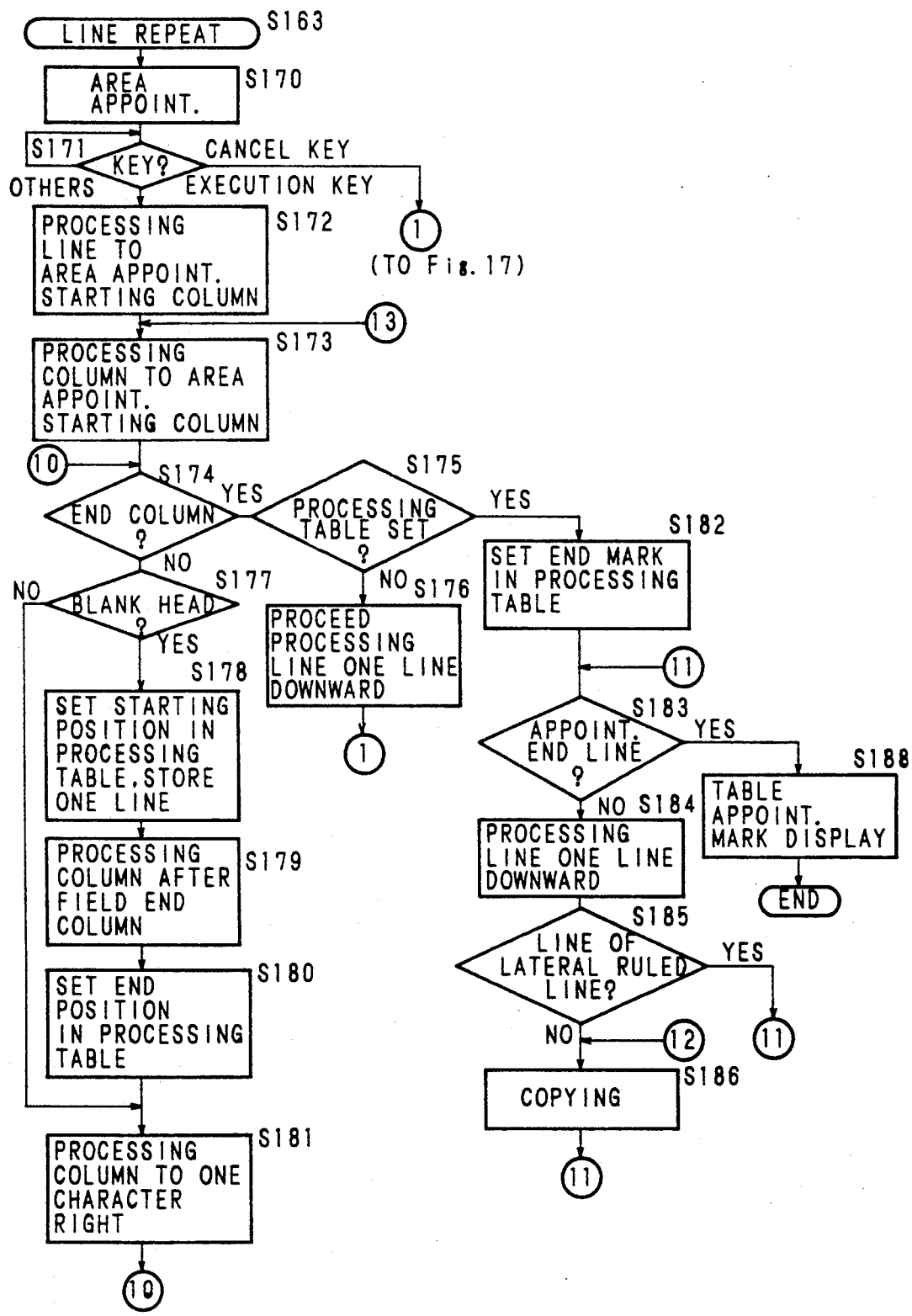
FIG. 18 is a flow chart of a line repeat.

This line repeat processing is executed by a processing flow in FIG. 18. That is, when a two-dimensional operation (area appointing) is performed to move the cursor C2 rightward and downward with a cursor key SW2 in Step S170, an execution area of the line repeat is reversed into black (FIG. 24F). The area can be appointed not entirely but to the midway. When the area appointment is acceptable, the execution key SW1 is pressed. The processing, then, moves to Steps S172, S173 and the processing line and column are advanced to the area appointment start line and column. Next, in Step S174, it is determined whether the processing column is the area appointment end column or not, and in Step S177 whether or not the field start position is determined.

In this case, there is no defined field, then, the processing moves to Step S181 to advance the processing column one character rightward and it returns to Step S174. The processing is repeated as Steps S174→S177→S181→S174 to finish one line processing. Then, the processing moves to Step S175, wherein it is determined whether information is set in the repeat processing table or not. The repeat processing temporarily stores the start column position, end column position and end mark of the respective fields for the line being repeated or the line where the defined field is present.

In this case, it is determined whether it being NO or not in Step S175 and the processing line is advanced one line in Step S176, and the processing moves to Step S178 at fourth column in the processing of such Steps as S173→S174→S177→S181→S174→S177. Here, the starting position of the first field is set in the repeat processing table shown in FIG. 25, and data of the text memory M1 of the processing line are stored in the register for one line. In Step S179, the processing column is advanced after the end position of said field, and in Step S180, the end position of the field is set. In Step S181, the processing column is advanced rightward by one character to find the next field, for which information is set in the repeat processing table. This processing is the same as the first field.

When one line (fourth line) is processed in such a manner, it is determined whether it is YES or not in Step S175. Then, in Step S182, an end mark "FF" is set in the processing table, and it is determined whether or not the area appointment and line in Step S183. In this case, the processing line is advanced one line downward in Step S184 as it is not the end line. In Step S185 it is determined whether the processing line is the lateral ruled line or not, and in the case of YES, the processing returns to Step S183 and the processing line is advanced one line in Step S184. Since this line is the first repeat line, it is determined whether it is NO or not in Step S185, and copying is performed for one line in Step S186 with the repeat processing table information. That is, first, the processing is started from the left field of the repeat processing table to see whether the start position data of No. 1 field is the end mark or not. In the case where the data is not the end mark, with the position information of the start position "4" and end position "14", data of 4 through 14 columns, that is, data of "X X . . . X" of the article name field are taken out for one line from the register data so as to copy it on the position of 4 through 14 columns of the processing line. Similarly to it, for the fields No. 2 through No. 4, with the processing table data, "N . . . N", "N . . . N", "N . . . N" data are copied on the processing line from the register for one line for the unit price, quantity and sub-total. When the processing in the repeat processing table is advanced rightward to the field No. 5, an end mark is detected so that the processing can return to Step S183 after repeating for one line. Since the ruled lines are to be processed next, the processing is advanced as Steps S183→S184→S185→S183→S185→S183→S184, and the second repeat processing is executed on the next line similar to the aforementioned. When the processing line is the last area appointing line, it is determined whether it is YES or not in Step S183, and as shown in FIG. 24G, the table appointing marks "▽" (starting mark) (24) and "△" (end mark) (25) are indicated in Step S188. At the same time, the character with bright underlines is written in the field which was blank in FIG. 24E for display to indicate the end of repeat, and then, the processing completes the line repeat processing and returns to Step S141 in FIG. 17. The table appointing mark can be written and erased by using a specific bit of the ruled line as the table appointing mark bit and changing this bit.

FIG. 24G shows the state wherein the definitions for all of the estimation fields are temporarily registered (the character with bright underlines is set on the text memory M1 but not on the field management table T3). Since the state of field definition is displayed in such a way and the character size and area are clear at a glance, the operator presses an end key F11 when he or she judges that the definition is acceptable. Then, in Step S6 of FIG. 3, the end of card design routine is determined and the field management table set routine of Step S7, namely, a routine for setting field position defining information which is temporarily registered in the card design routine on the field management table T3 is executed.

Figure 20:
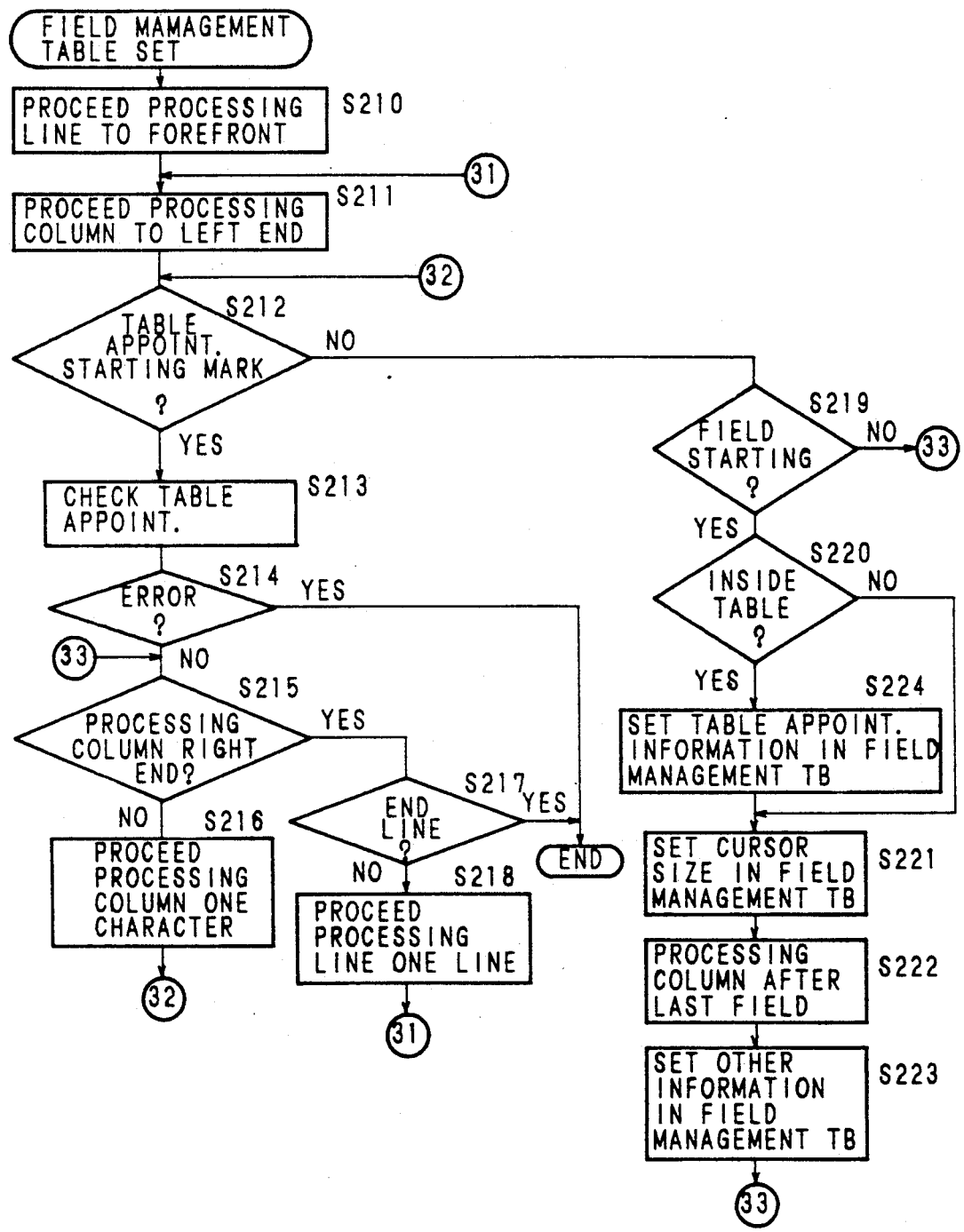
FIG. 20 is a flow chart of a field management table set.
Figure 21:
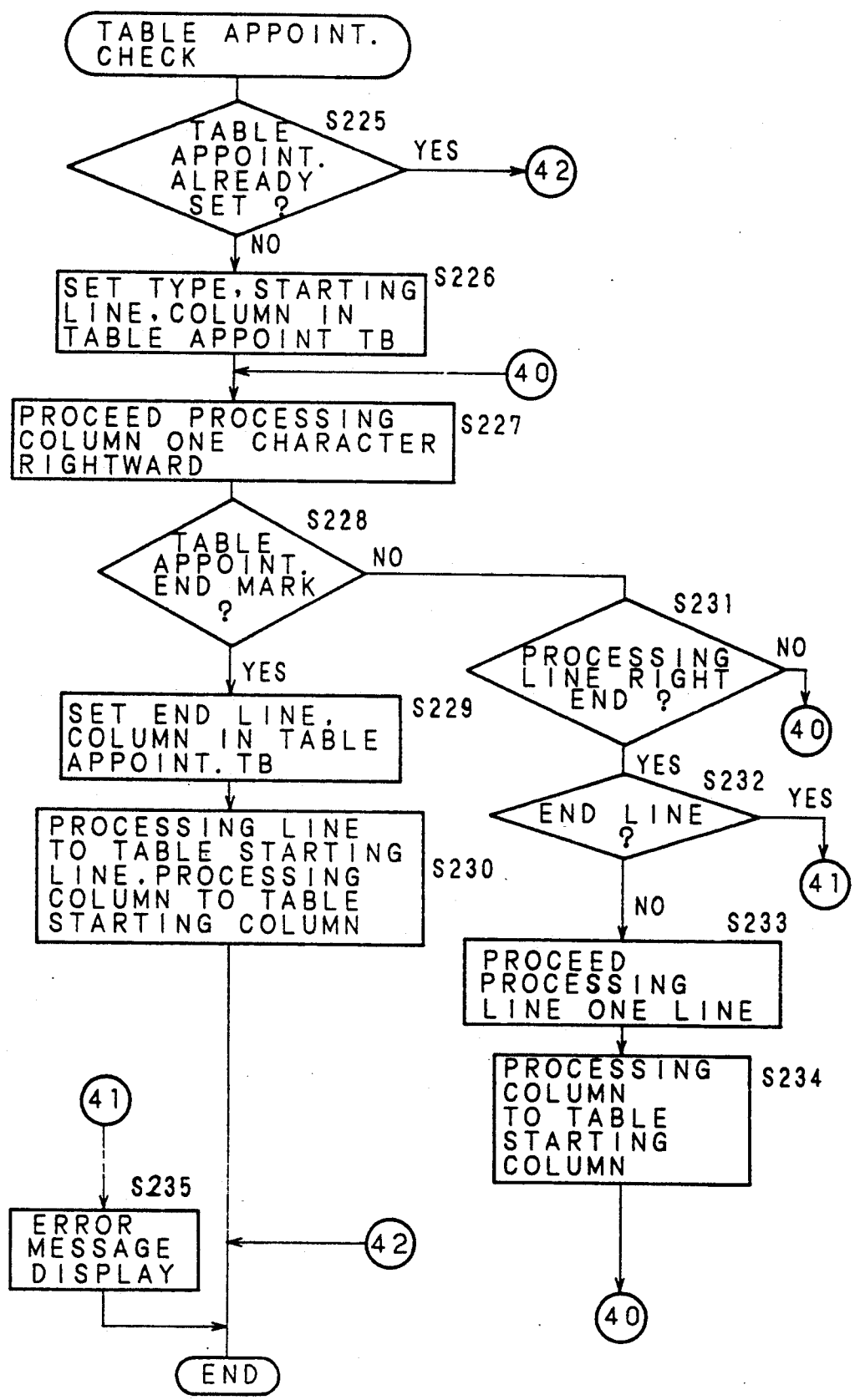
FIG. 21 is a flow chart of a table appointment check,
FIG. 22(*a*) is a flow chart of a condition register,
FIG. 22(*b*) is a flow chart of a conditional equation definition,
FIG. 23(*a*) is a flow chart of an operational equation repeat,
FIG. 23(*b*) is a flow chart of a field search.

The field management table set (Step S7) will be described according to flow charts in FIGS. 20 and 21. Text data as shown in FIG. 24G are stored in the text memory M1, and the field defining conditions being temporarily defined are determined and processed line by line and set in the field management table T3. That is, in Step S210, a line to be processed is set in one line and, in Step S211, a column to be processed is advanced to the left end. Whether or not the table appointing start mark is checked in Step S212 and, because there is no start mark to the 5th line, that is, it shows NO, the processing moves to Step S219, wherein the field starting position is checked. Since there is no field to the 8th line in the present case, the processing moves to Step S215, wherein it is determined whether the processing column is at the right end or not. In the case of NO, the processing column is advanced one character to the right in Step S216 and the processing returns to Step S212. When the processing column is moved to the right end according to the flow of the Steps S212→S215→S216→S212→S215, the processing moves from Step S215 to S217 wherein it is determined whether or not it is the last line. When it is determined to be NO in Step S217, a line to be processed is advanced one line in Step S218, and the processing returns to Step S211. Second through fourth lines are processed similarly to the first line and nothing is set in the field management table T3.

When the processing is advanced to the 5th line, a start mark is discriminated in Step S212, and the processing moves to Step S213 wherein the table appointment is checked. The processing is executed according to the flow chart shown in FIG. 21. In Step S225 it is checked whether information has already been set or not in the table appointment table shown in FIG. 26. In the case of NO, the processing moves to Step S226, wherein 0 (0: no line repeat and column repeat, 1: line repeat presents, 2: column repeat presents) is set in a type field, and the starting line and column of the start mark are set respectively. As the type information, information stored in the register when executing the repeat in processing Step S163 of the line repeat and processing Step S164 (to be described later) of the column repeat are used. Then, in Step S227, the processing column is advanced one character to the right, and in Step S228, it is determined whether or not the table appointing end mark. In the case of NO, it is determined in Step S231 whether the processing columns is at the right end or not, and the processing returns to Step S227 when it is NO. By repeating such processings as S228→S231→S227→S228→S231, the line with the start mark is advanced to the right end column. When it is determined it is YES in Step S231, whether or not the last line is determined in Step S232. In the case of NO in Step S232, after executing the processing in Step S233 wherein a line to be processed is advanced one line, the processing column is advanced to the table appointment starting column in Step S234 and the processing returns to Step S227.

Since the existing processing line is the field name field and having no start mark nor definition appointing field, the processing repeats such Steps as S227→S228→S231→S227, and when it is determined YES in Step S231, the following line is processed by such Steps as S231→S232→S233→S234. Since the following line is the ruled line, the same processing as the previous line is executed.

When the processing line reaches the 17th line a table appointing end mark is detected in Step S228, the end mark line and column are set in the end line field of the table appointing table in Step S229. Thereafter, in Step S230, the processing line and processing column are set, in the table appointment starting line and the table appointment starting column respectively, and the processing moves to Step S214 shown in FIG. 20 after ending the table appointment check routine.

In Step S214, when the table appointing end mark is not found, an error flag is raised. Also, when there is no table appointing end mark in Step S228, the processing moves from Steps S228→S231→S232 to Step S235 displaying an error message on the screen. When there is no error in Step S214, the processing flows as Steps S215→S216→S212→S219 and a routine for searching the field from the table appointment starting line is started.

Figures 25, 26, 29:
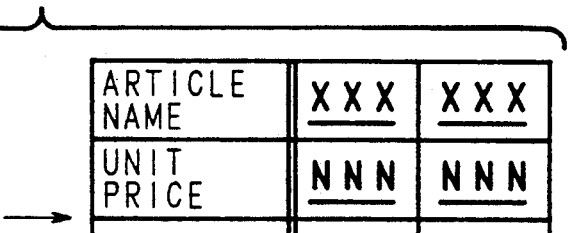
FIG. 25 is a schematic view of a repeat processing table.
FIG. 26 is a schematic view of a table designating table.
FIG. 29 is an explanatory view of the column repeat.

That is, when the processing column is the 9th column in the 8th line, in Step S219, the bright line bit of the character "X" is discriminated. In Step S220, it is determined whether the field is 0: outside the table, 1: inside the line repeat table or 2: inside the column repeat table. In the case of 1 and 2, the information (in this case 1) is set in the table appointing information field in the field management table T3 of FIG. 27 in Step S224. For this setting the table appointing table information of FIG. 26 is used. In Step S221, as shown in FIG. 27, the numeric "3" is set in the cursor type field of field No. 1 to indicate that the character size and cursor size are the full-size. Simultaneously, it is set in the type field that the field type is the "character". In Step S222 a column to be processed is advanced to the column after the last column of the processing field. Thereafter, in Step S223, the other information are set in the field management table T3. That is, there are set as the column starting position, the column starting position "4" stored in Steps S219, as the line position, the line position "8" stored in Step S218, and as the data length a count value in Step S222, respectively. And as the field name, the character data being read out from the text memory M1 in the next processing in response to the field defining position (area) is set.

That is, in the first step, characters in a left-hand block (a section surrounded by longitudinal ruled lines) of the field starting position are read out, and when there is no ruled lines, the characters in the area between the left-side of the field starting column position and the margin are read out. When there is no character data on the left-hand side, the characters in the upper block of the field defining position are read out in the second step, and when there is no block, the characters in the column area similar to the field defining area are read out. In the third Step, when the characters can not be read out in the first and the second steps, the field names are "character No. 1", "character No. 2". . . are given from the left to the right and the top to the bottom and are automatically set in the table. In this case, it must be named so that the field type and No. can be distinguished. During the table appointment, the second step is given priority for the line repeat and the first step is given priority for the column repeat. Thus, in this embodiment, the characters of article name, unit price and quantity are read out and set in the second step. When the table appointment is processed, numbers are changed for every line or column for each field name such as article name 1, and article name 2 . . . in the case of article name.

When the processing of the field management table set of field No. 1 is finished, according to the flow of such Steps as S215→S216→S212→S219, whether the field setting position is present on the right-hand side of field No. 1 is detected on the 8th line, and in the case YES, the same processing is executed as the field No. 2.

That is, defining information for each defining field of the unit price, quantity and sub-total are set in the field management table T3 of FIG. 27 and the field management table set for one line is finished. For the 10th, 12th, 14th and 16th line having the fields defined by the repeat function, the field management table T3 is set by the same procedures as the 8th line. When the processing is advanced to the last column in such a manner, it flows as Step S215→S217 to end the field management table set routine.

Incidentally, while the field management table set routine is executed, the card table screen is shown as FIG. 24G. However, in lieu of displaying the card definition on the bottom of the screen, besides displaying "field under definition" which line and column is to be processed is displayed at real time to tell the operator that the processing is on progressing.

After finishing the field management table set, the processing moves to Step S8 wherein the table set of FIG. 3 is determined and processed. In this Step S8, an error flag being set in Step S214 of FIG. 20 is observed, and when the flag is raised or when the defining field can not be found, it is determined as error and the processing returns to card design in Step S5 to ask the operator redefinition of the field to the operator. When it is determined in Step S8 that there is no table setting error, the processing moves to Step S9, wherein the characters "X" with bright underlines shown in FIG. 24G are erased. In Step S10, the card screen is displayed as shown in FIG. 24H. At this time, a blank card is displayed as it is, just after the card definition. When the data processing file is not newly generated in Step S3, the processing proceeds to Step S10 to display the first card wherein each field data and card format image data are composed. In Step S11, the cursor C2 is displayed on the card. That is, the size data is read out from the cursor type field of the field management table T3 and the cursor C2 is displayed on the screen according to the size. The initial set position of the cursor is the head column of field No. 1 where the field data input waited.

(2) Condition Register Processing

Next, a defining function of an operational equation which defines the sub-total 1 to be unit price 1×quantity 1, and an operational equation repeat function which repeats the definition in the sub-total field of the lower line in the screen shown in FIG. 24H will be described.

In the screen shown in FIG. 24I (Step S12 of FIG. 3), when a condition register key (not shown) is pressed, the processing moves to Step S23 to execute condition register processings shown particularly in FIGS. 22 and 23.

Figure 22A:
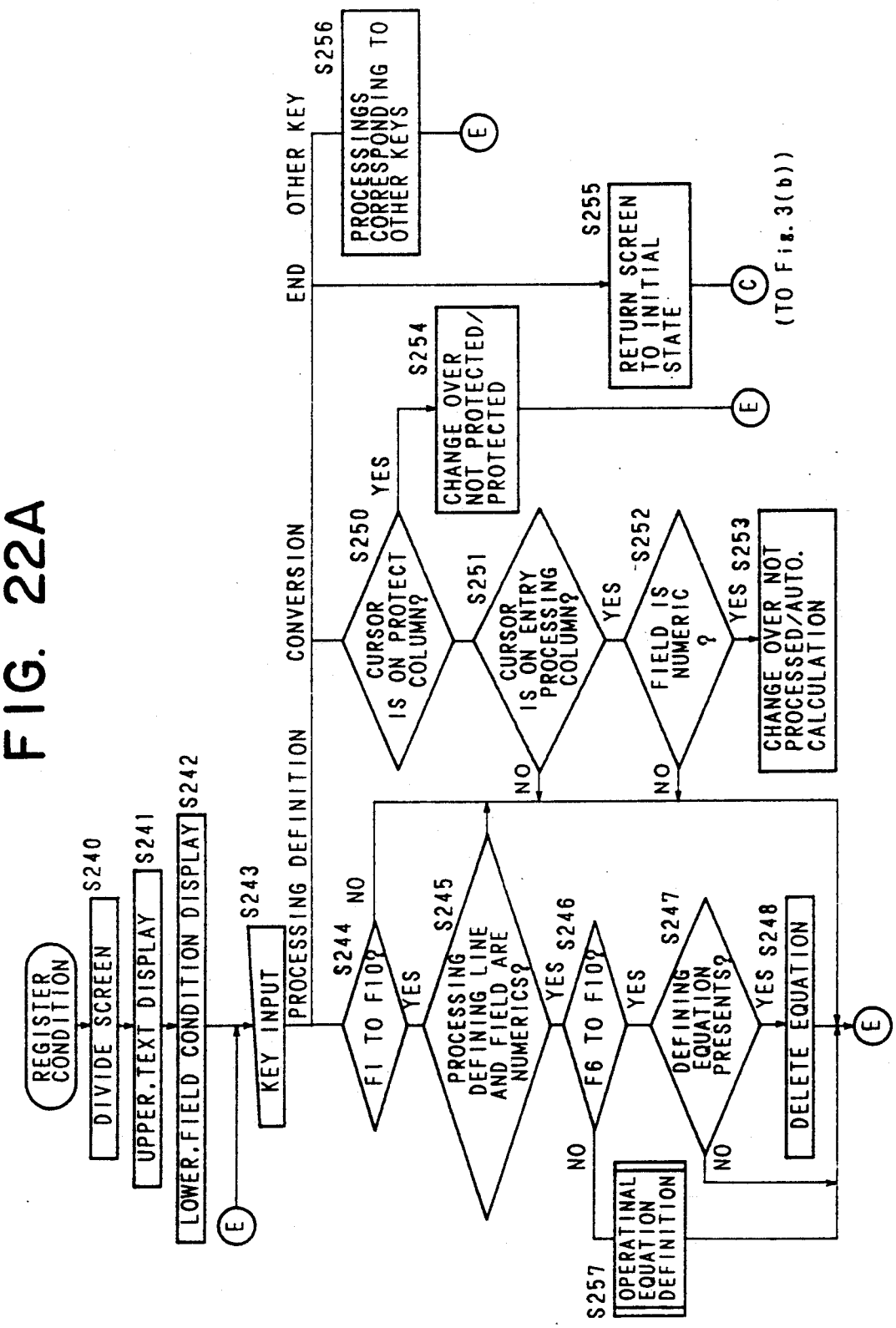

That is, in FIG. 22(a), a screen is vertically divided into two in Step S240, and in Step S241, a card image is displayed on the upper half, and in Step 242, a field condition defining table is displayed on the lower half (FIG. 24J). In the table, "field name", "type", "protect", "entry processing", "processing definition" and "reference retrieval" are displayed automatically. At this time, the cursor is in the lower screen and in the movable state. When a conversion key (not shown) is pressed, the processing proceeds to Step S250 wherein it is determined whether the cursor C1 is located on the column of "protect" when the key is depressed, in the case of YES, the processing moves to Step S254, wherein "protect" is changed over and the display of the "protect" column is changed over to "protected" if "not protected" and to "not protected" if "protected".

Incidentally, as an initial value "not protected" is set. "Not protected" signifies that input data of the field is accepted and "protected" signifies that the input data of the field is not accepted. When protected, movement of the cursor is controlled to pass (skip) the field.

When the cursor C1 is not on the column of "protect" in Step S250, the processing moves to Step S251, wherein it is checked whether the cursor C3 is on the column of "entry processing" or not. In the case where the cursor C3 is on the column of "entry processing", it is determined YES and the processing moves to Step S252, wherein it is determined whether the field is the numeric one or not. In the case of numeric field or YES, in Step S253, "not processed" or "automatic calculation" of the "entry processing" are changed over, respectively to "automatic calculation" or "not processed". Incidentally, an initial value of the "entry processing" is also set to "not processed". The processing returns to Step S243 when it is determined NO in Steps S251 and S252. For example, when the conversion key is pressed in the state where the cursor C1 is located at the field names "sub-total 1", "entry processing" at the first condition cursor setting, the processing flow proceeds as Steps S250, S251, S252, S253, changing over "entry processing" of "sub-total 1" from "not processed" to "auto calculation", and returns to Step S243.

When the cursor key C1 is operated and the cursor is moved to the "processing definition" column (FIG. 24M), an input accept of function keys F1·to F10 of "operation equation register change", "delete operational equation" is displayed on the bottom of the screen. When one of the function keys F1 to F5 is pressed to delete "processing defining register", it is determined YES in Step S244, wherein whether or not either of the function keys F1 to F10 is pressed is determined, and the processing moves to Step S245. In this Step S245, it is determined whether the cursor C1 is on the column of processing definition and the field is the numeric field or not. In this case, it is determined NO in Step S246, wherein whether either of the function keys F6 to F10 is pressed is determined in the case of YES, and the processing moves to the operational equation defining flow in FIG. 22(b).

In Step S260, an equation defining line L3 is displayed together with the separate cursor C3 on the bottom of the screen. In Step S261, the cursor C2 is moved to the card side (upper screen) and it is in the state of key input wait in Step S262.

Here, when the cursor key C2 is operated, in Step S268 it moves between the carding fields. By moving the cursor C2 first to the "unit price" (FIG. 24O) and pressing only the execution key SW1 (without inputting the unit price 1), in Step S263, "unit price 1" is read out from the field management table T3 and set in the equation defining line to be displayed. Next, when a × key of the operator (+, −, ×, ÷) keys is pressed, in Step S267, the character "×" is set after the "unit price 1" to be displayed. Furthermore, when the cursor key C2 is moved to the "quantity" field (FIG. 24R) and the execution key SW1 is pressed, in Step S263, "quantity 1" is set after the character "×" to be displayed. If the operational equation is accepted, it is determined YES in Step S269 when an end key F11 is pressed. It is determined in Step S265 whether the field of sub-total 1 is in the table, and in the case of YES, it is displayed in Step S266 to ask whether the operational equation on the bottom of the screen is to be repeated or not. When the function keys F1 to F5 are pressed here, the processing moves to Step S271 to execute the operational equation repeat and the processing returns to Step S262 when the function keys F6 to F10 are pressed.

Figure 23A:
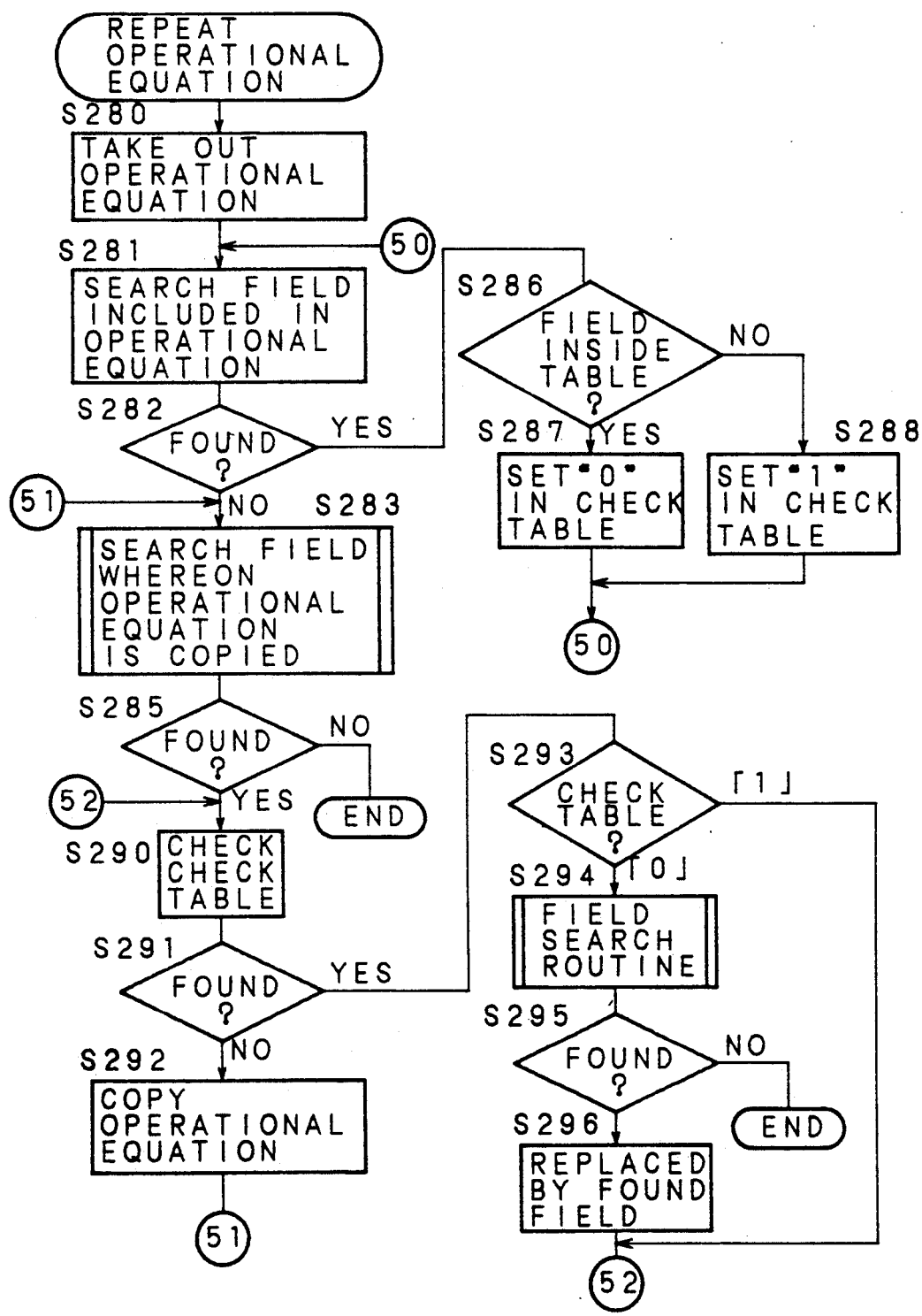

The repeat processing of the operational equation is executed according to flows shown in FIGS. 23(a), (b). That is, in Step S280, the operational equation "unit price 1×quantity 1" being set in a processing defining field of sub-total 1 is taken out to the register. In Step S281, the field name included in the operational equation is searched from the left to the right. If it is found in Step S282 the processing moves to Step S286 to determine whether it is the field within the table or not. In this case, it is determined YES because the field name of unit price 1 is found first. In Step S287, unit price 1 is set to 0 (0 indicates the in-table field) in a check table and the processing returns to Step S281. In the case of NO in Step S286, unit price 1 is set to 1 (1 indicates the out-table field) in Step S288. The field name of quantity 1 is found out in a flow of such Steps as S281→S282→S286→S287 and set in the check table as quantity 1 to 0. Then, the processing moves from Step S281 to S282, wherein it is determined NO, and in Step S283, a routine for searching the field which repeats the operational equation is executed in Step S283.

Figure 23B:
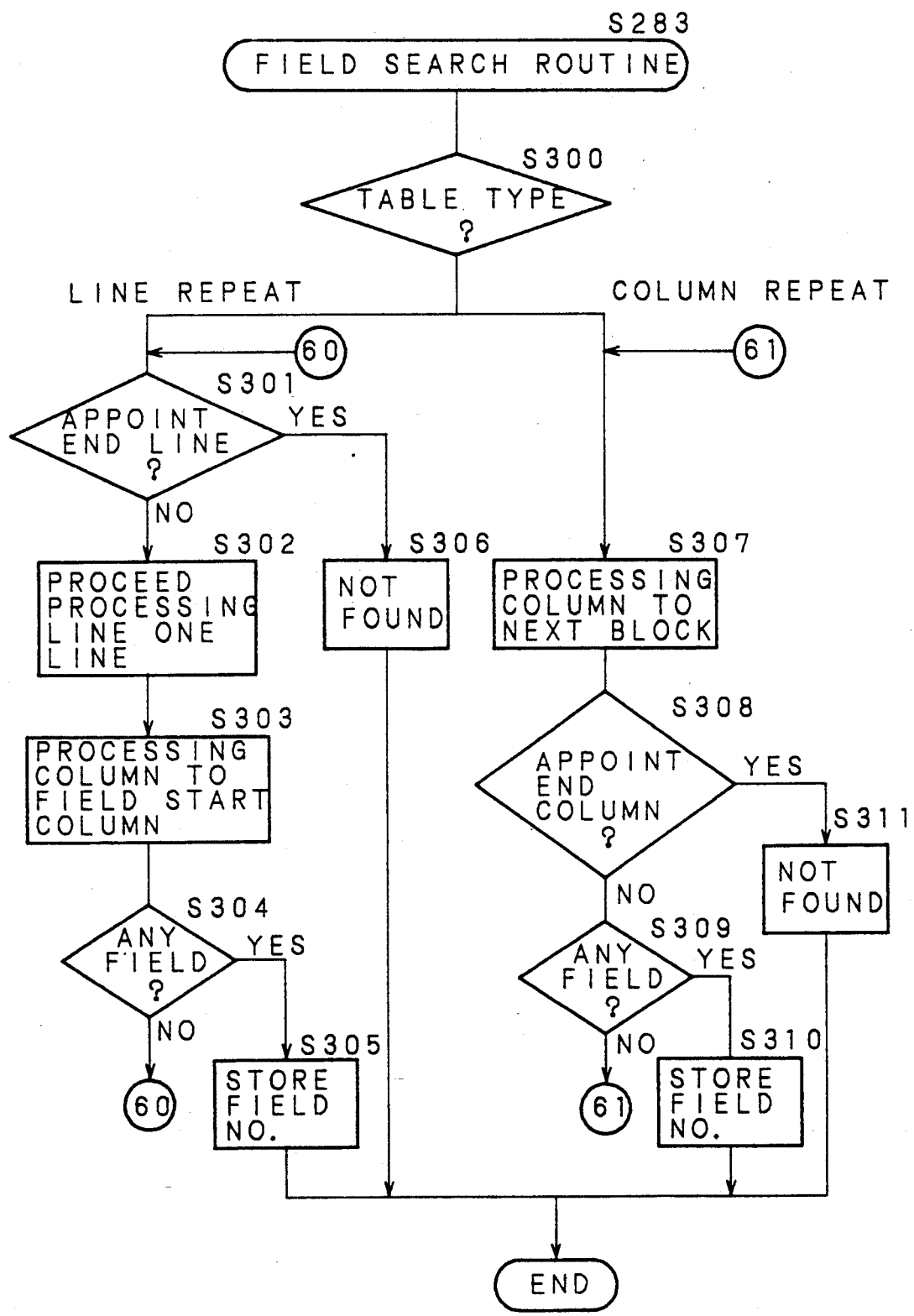
Figure 240:
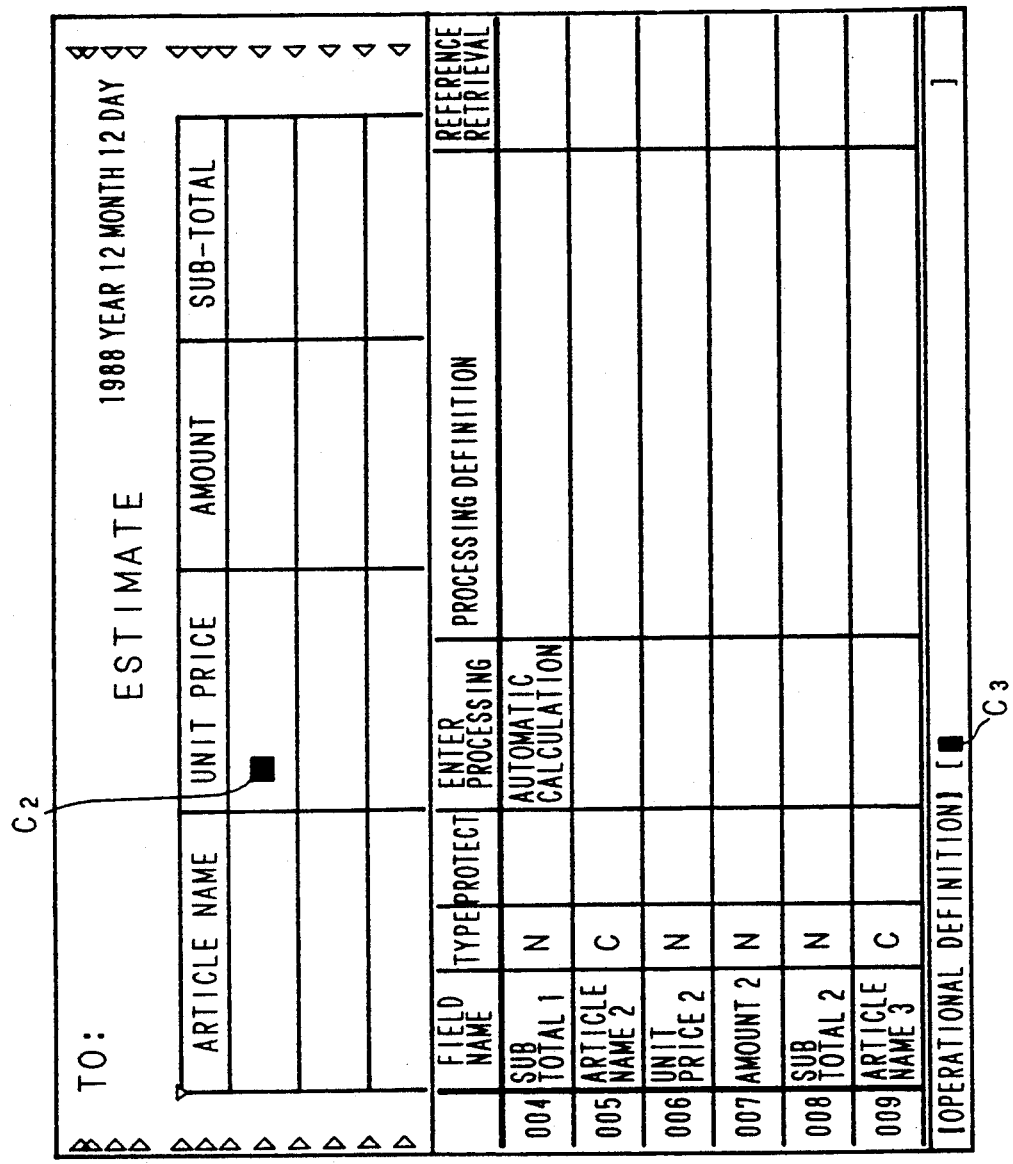

The set field search routine is executed in FIG. 23(b). That is, in Step S300, a table type is determined and the processing moves to Step S301 because it is the line repeat. In Step S301, it is determined whether or not the appointment end line, and since the line where the cursor C2 has located (definition end line) in FIG. 24R is NO in this case, the processing line is advanced one line in Step S302. In Step S303, a processing column is advanced to a starting column of the sub-total 1 field defined by the operational equation, and in Step S304, it is determined whether there is the field or not. It is possible to determine it by referring to the field management table T3. In this case, since the processing line is a ruled line, the processing returns to Step S301 for processing the next line in the case of NO. When the sub-total 2 field is detected in Steps S302→S303→S304, the field number is stored in a field number register in Step S305. In this case, field No. 8 of the sub-total 2 is stored to end the field search routine.

Next, in Step S285 the check table is scanned to detect the field being set. It is determined YES in Step S291 because the "unit price 1" can be found. In Step S293, it is determined whether the set value is 1 or 0, and the processing moves to Step S294 to execute the aforesaid field search routine because it is 0. Here, it is searched whether the unit price field corresponding to the unit price 1 is present or not. In Step S295, it is determined YES because the unit price 2 field can be found in the 10th line, and in Step S296 the unit price 1 of the operational equation, unit price 1× quantity 1, being set in the register is replaced by the unit price 2 and the processing returns to Step S290. Similarly, the quantity 1 is also processed so that the operational equation being set in the register becomes such one as unit price 2× quantity 2 when the set field has been scanned in Step S290, the processing moves to Step S292, wherein an equation in the register is set in the processing defining field of the sub-total 2 field.

Figure 22B:
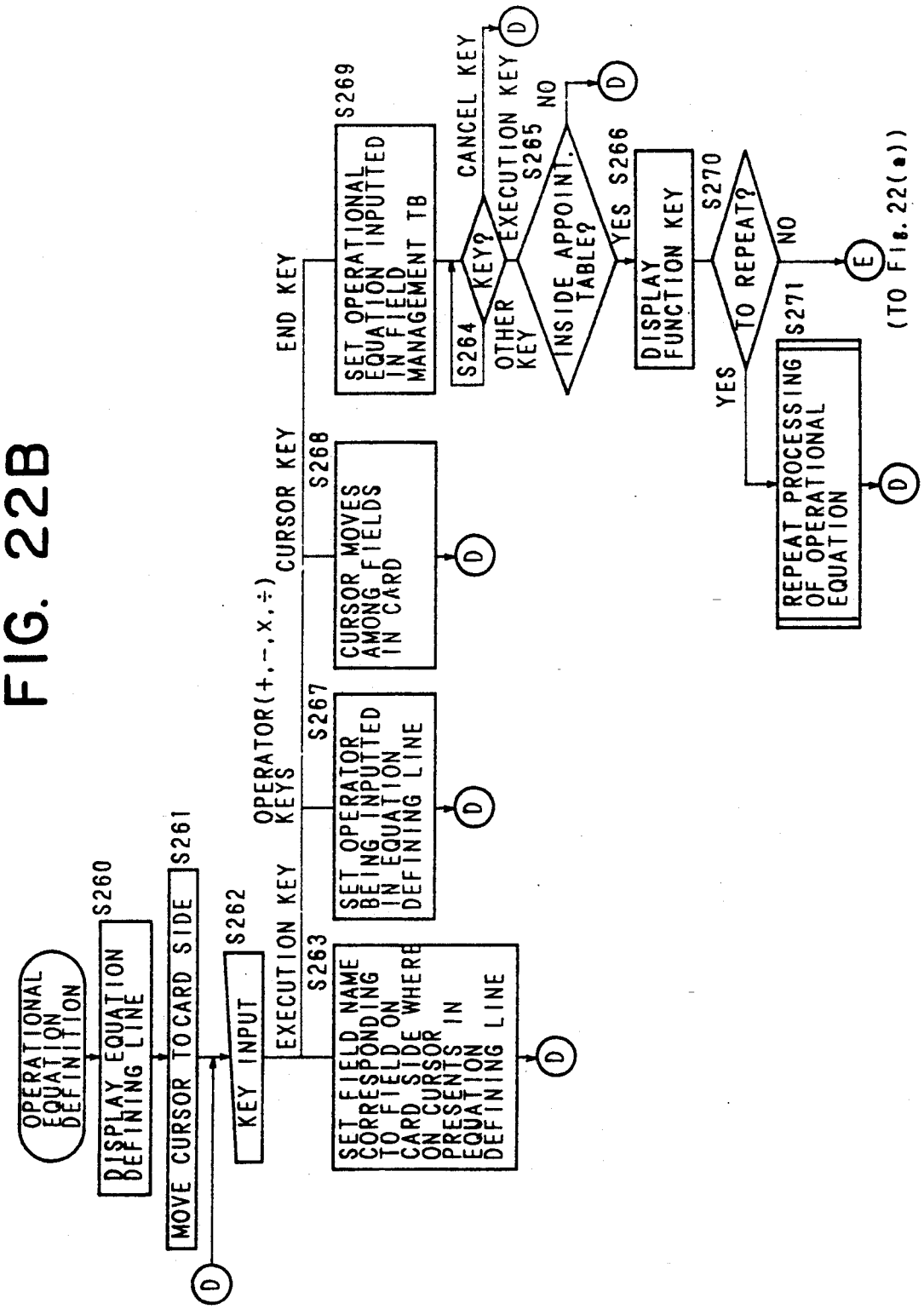

When the processing proceeds to the last line and it is determined NO in Step S285, the processing ends the operational equation repeat and returns to Step S262 of FIG. 22(b). Likewise, when it is determined NO in Step S295, the processing returns to Step S262. In the operational equation repeat processing, as shown in FIG. 24T "under processing" is displayed on the bottom of the screen and when the processing is finished, in the fields of sub-total 2, sub-total . . . of the processing defining field in the field condition defining table, the operational equation is displayed to tell the set end. Incidentally, in Step S292 setting of the protect and entry processing (auto calculation) fields are simultaneously executed (FIGS. 24U, 24V).

When registration of the operational equation is released or the operational equation is deleted in the display screen of FIG. 24V, the cursor C1 is positioned to the place where the definition equation to be deleted is displayed and either of the function keys F6 to F10 is pressed. Then, the processing moves to Step S247 via Steps S244, S245, S246 in FIG. 22(a), wherein it is determined YES and the equation is deleted in Step S248. That is, the definition equation stored in the processing defining field in the field management table T3 is cleared.

When the contents of field defining condition shown on the bottom of the screen are acceptable and the end key F11 is pressed, the processing moves to Step S269, wherein data associated with protect, entry processing and processing definition are set in the field management table T3 as the displayed contents shown in FIG. 27. That is, the definition contents (protect, entry processing, processing definition) defined newly by the condition register, and the modified contents (though the field names have already been set in Step S7 of the field management table set, they can be changed) are set and the processing returns to Step S243. When the end key F11 is pressed again, the screen returns from the divided screen to the initial screen (FIG. 24W) in Step S255 to end the condition register routine, and the processing moves to Step S12 of FIG. 3.

Figure 28:
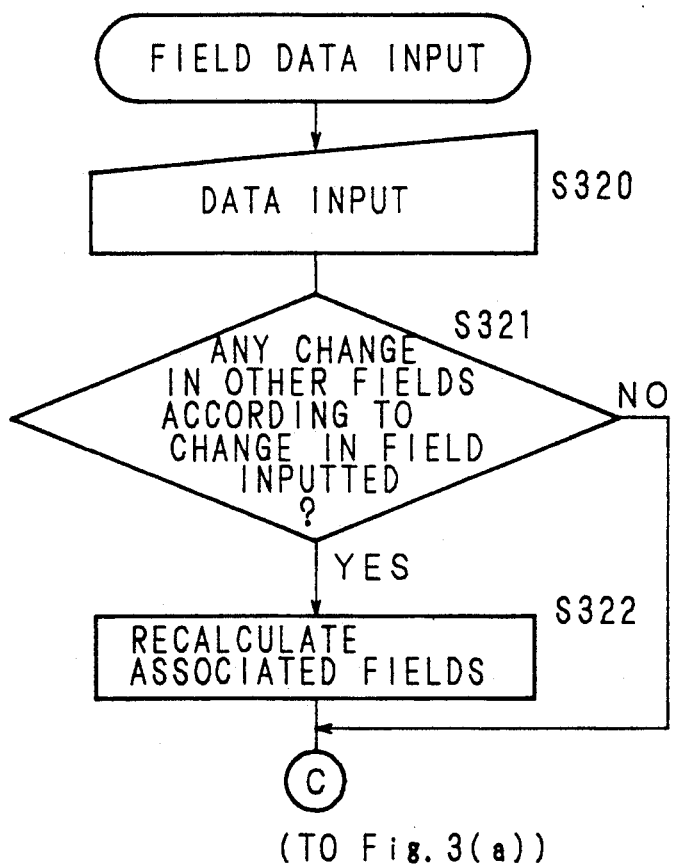
FIG. 28 is a flow chart of a field data input.

When the article name is inputted by a character key in Step S12 (FIG. 24W), the processing moves to field data input Step S13, of which processing flow is shown particularly in FIG. 28. That is, when field data inputs are accepted and the quantity "250" is inputted as shown in FIGS. 24W to 24Y in Step S320, whether or not there is any change in the other fields according to the change in the inputted fields is determined in Step S321 with reference to the field management table T3. When it is determined YES in Step S321, the processing moves to Step S322, wherein the definition equation $100 \times 250 = 25,000$ is automatically calculated, inputted in the sub-total 1 field and is set in the record memory M2 (FIG. 24Z). FIGS. 24Z-1 through 24Z-3 show changes on display screen by the record input and automatic calculation.

(3) Column Repeat Function

Figure 19:
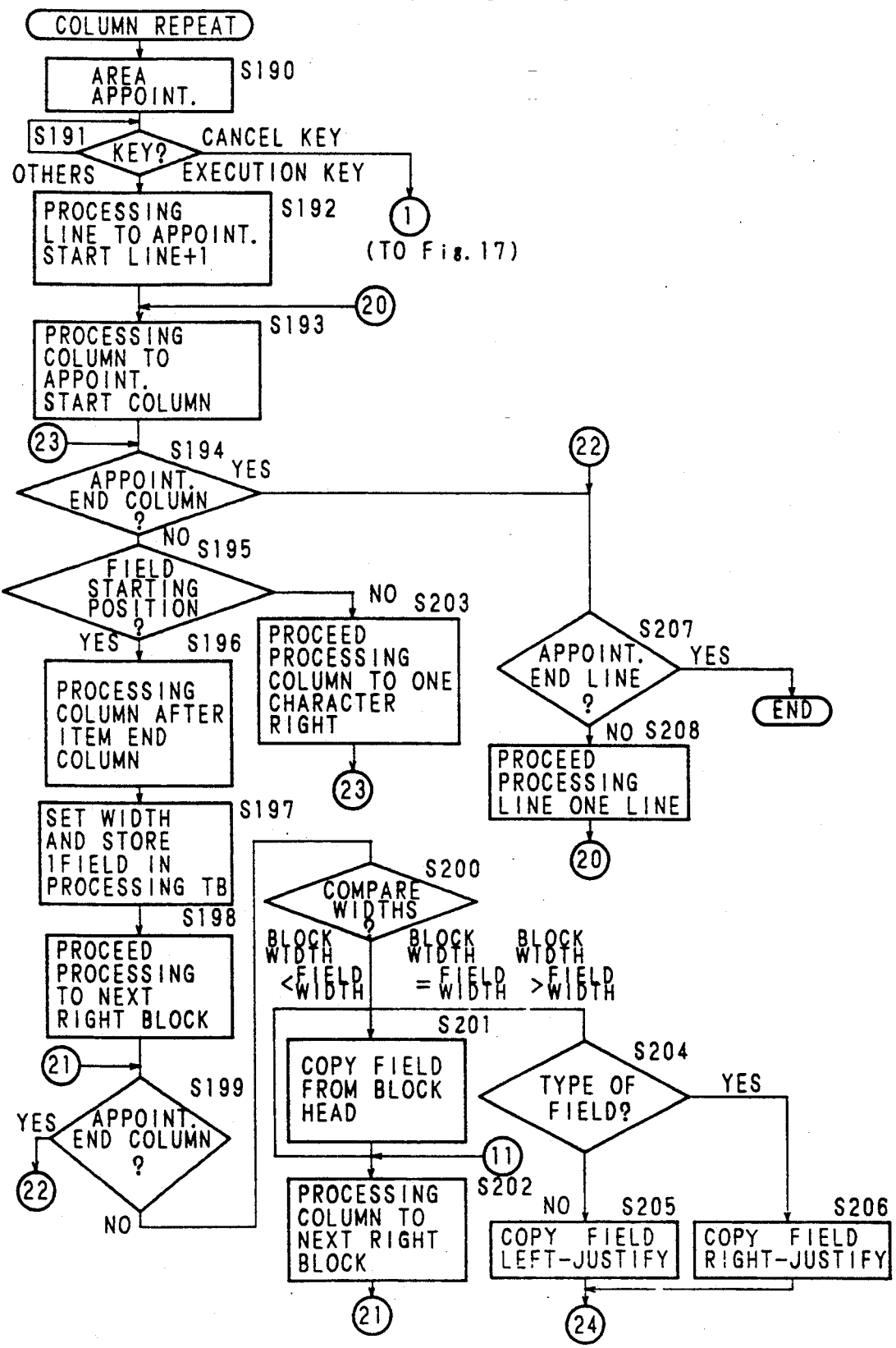
FIG. 19 is a flow chart of a column repeat.

When the column repeat is selected in Step S162 of the display appointing routine of FIG. 17, a column repeat routine S164 shown in FIG. 19 is executed.

When, for example, the fields are present longitudinally (line) and the defining fields are present laterally (column) as shown in FIG. 29, the latter is repeated laterally. This processing is advanced rightward line by line and block by block.

That is, in Step S190, upward and downward moving keys of the cursor key are operated to do area appointment. This is processed similarly to FIGS. 24E and 24F, and the area is appointed so as to include at least one or more defined fields and the adjoining block on the right thereof (a block held between longitudinal ruled lines including the field to be repeated). In this embodiment, it will be described such that the entire table is subjected to do area appointment (appointing area view in black reverse on the screen) as same as FIG. 24F. When the displayed area appointment displayed is acceptable, an execution key SW1 is pressed. Then, in Step S192, a line to be processed is advanced to the area appointment starting line +1, and in Step S193, a column to be processed is advanced to the area appointment starting position. In Step S194, it is determined whether or not the appointment end column, and in the case of NO, the processing moves to Step S195, wherein it is determined whether or not the field starting position. When it is not the field starting position, the processing moves from Step S195 to Step S203 wherein the processing column is moved one character to the right and it returns to Step S194. When the field (article name XXX) starting position is found in Step S195, the processing column is advanced to the column after the field end position in Step S196. In Step S197, the field width is set in the column repeat processing table and the field content (XXX) is stored in the register. In Step S198, the processing column is advanced to the next right-side block (a section held between longitudinal ruled lines), and in Step S199, it is determined whether or not the processing column is the area appointing end column. In the case of NO in Step S199, the block width and the processing table field width are compared in Step S200.

When the block width is smaller than the field width, the processing column is advanced to the next block in Step S202 (processing of the path not copied). When the block width and the field width are equal, field contents of the register is copied in the processing block in Step S201. When the block width is larger than the field width, it is determined in Step S204 whether the field type is character or numeric, and in the case where it is character, it is left-justified in the processing block to copy the field content of the register, and in the case where it is numeric, it is right-justified in the block to copy the field content of the processing table. The column repeat for the article name field block is executed in such a way.

When the column repeat for one line is finished, it is determined YES in Step S199, and in Step S207, whether or not the last area appointing line is determined. In the case of NO in Step S207, the processing line is advanced one line in Step S208, and the processing returns to Step S193 for the next processing.

Since the next line is the ruled line, copying is not performed and the processing moves to copy the next unit price line. Processing on this line is similar to the column repeat of the aforementioned article name line, then, its detailed explanation will be omitted. A difference is that the numeric is determined in Step S204, and that it is right-justified by copying and is displayed clearly in Step S206. Though it has not been referred to, in the case where the field is the time such as ∞ hour ∞ minute, it is right-justified similarly to the numeric.

Likewise, copying of the quantity and sub-total line is performed similarly, and when the last area appointing line and last column are processed, the processing proceeds to Step S199→S207 and ends the column repeat processing.

Since the column repeat to the operational equation definition is performed similarly to the line repeat in FIGS. 23(a), (b), its detailed description will be omitted. The repeat processing is executed only on the sub-total line of FIG. 29. Particularly different from the line repeat is that, when the table type is determined as the column repeat in Step S300 of the field search routine (FIG. 23(b)), the processing moves to Step S307. Here, the processing column is advanced to the starting column of the next right block of the defined field, and in Step S308, whether or not the block and column is determined. In the case of NO in Step S308, whether there is the field in the processing block or not is checked in Step S309, and when there is no field, the processing returns to Step S307 so as to proceed the processing to the next right block. When there is the field in Step S309, it is set in the field No. register in Step S310 to end the field search routine. When YES is determined in Step S308, a flag for indicating undetectable is raised (Step S311) to end the search routine. Incidentally, it is possible to determine whether the field is present in the block by observing the field starting position suddenly without scanning from the block starting column to the end column, since the field starting position in the block is known beforehand by the field position definition repeat.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the meets and bounds of the claims, or equivalence of such meets and bounds thereof are therefore intended to be embraced by the claims.

What is claimed is:

1. A data processing apparatus comprising:
   display means for displaying a card image having a plurality of field names and a plurality of field data inputted into fields indicated by said field names in the card image;
   first memory means for storing said card image;
   second memory means for storing said field data;
   third memory means for storing field defining information which includes the information indicating a display area of a predetermined number of characters for the field in said card image and defines the contents of each field;
   display area designating means for designating the display area of a said field in the card image displayed on said display means by moving a cursor;
   storing control means for storing in said first memory means the predetermined number of characters to be displayed in a field display area with the positional information of the display area designated by said display area designating means;
   display control means for displaying on said display means the card image and predetermined characters of a field display area stored in said first memory means; and
   memory control means for searching said predetermined characters from the contents stored in said first memory means, analyzing the displayed area set by the searched characters and storing the analyzed result in said third memory means as a defining information.

2. A data processing apparatus as set forth in claim 1, further comprising storage instructing means for instructing the operation of said storage control means.

3. A data processing apparatus as set forth in claim 1, wherein said display area designating means, designates said display area by movement of a cursor of said display means and, reverses said display area to display it on said display means in cooperation with the movement of said cursor.

4. A data processing apparatus as set forth in claim 3, wherein said display means includes a cursor and further comprising size setting means for setting the size of said cursor, said display area designating means designating said display area with the cursor of the set size.

5. A data processing apparatus as set forth in claim 4, wherein said display area designating means designates the display area within an area where some characters are displayed on said display means.

6. A data processing apparatus as set forth in claim 5, wherein said display area designating means reads the size of a cursor in response to the displayed field data.

7. A data processing apparatus as set forth in claim 1, further comprising type designating means for designating the data type of a said field, said storage control means writing a predetermined character according to the data type designated by said data type designating means in said first memory means, and said third memory means storing field defining information including the designated data type and display area of said field.

8. A data processing apparatus as set forth in claim 7, wherein said data type designating means designates character or numeric data as the data type of a said field.

9. A data processing apparatus as set forth in claim 7, wherein said data type designating means designates character, numeric or date data as the data type of a said field.

10. A data processing apparatus as set forth in claim 9, wherein said data type designating means designates, when the type of field is a date, a describing type of date.

11. A data processing apparatus as set forth in claim 10, wherein said display area designating means reads, when the displayed field data is a date, a describing type of date in response to the displayed date.

12. A data processing apparatus as set forth in claim 1, wherein said display area designating means designates the display area with a nondisplay portion of said display means.

13. A data processing apparatus as set forth in claim 1, wherein said display area designating means designates the data length of said field data by designating the display area.

14. A data processing apparatus comprising:
   display means for displaying a card image having a plurality of field names and a plurality of field data inputted into fields indicated by said field names in the card image;
   first memory means for storing said card image;
   second memory means for storing said field data;
   third memory means for storing field defining information which includes the information indicating a display area of the field in said card image and defines the contents of each field;
   display area designating means for designating a predetermined number of characters for the display area of a said field in the card image displayed on said display means;
   storing control means for storing in said first memory means the predetermined number of characters as can be displayed in a field display area, with the positional information of display area designated by said display area designating means;
   display control means for displaying on said display means a card image and the predetermined characters of a field display area stored in said first memory means when the storing operation by said storing control means is finished;

repeating area designating means for designating the repeating area of a line or column, when field defining information is used repetitively in the line or column; and repetitive storing control means for repeatedly allowing to store in said first memory means predetermined characters stored in said first memory means for the line or column in the designated repetitive area.

15. A data processing apparatus as set forth in claim 14, wherein said repetitive area designating means designates said repetitive area by moving the cursor in the directions of line and/or column.

16. A data processing apparatus comprising:

display means for displaying a card image having a plurality of field names and a plurality of field data inputted into fields indicated by said field names in the card image;

display area designating means for designating the display area of said field in the card image displayed on said display means by moving a cursor; and display control means for displaying on said display means as many predetermined characters as can be displayed in the display area being designated by said display area designating means together with said card image.

17. A data processing apparatus as set forth in claim 16, wherein said display area designating means, when it designates said display area by movement of a cursor, displays said display area on said display means in cooperation with movement of the cursor.

18. A data processing apparatus comprising:

display means for displaying a card image having a plurality of field names and a plurality of field data inputted into fields indicated by said field name in the card image;

display area designating means for designating the display area of said field in the card image displayed on said display means by moving a cursor;

data type designating means for designating the data type of said field; and display control means for displaying as many predetermined characters according to the data type designated by said type designating means as can be displayed in the display area being designated by said display designating means on said display means together with said card image.

19. A field defining method for a data processing apparatus comprising:

a first step of generating a card image on a display means; and a second step of defining fields in said card image, said second step including a step of moving a cursor from a first position to a second position in the card image displayed on said display means, and a step of displaying as many predetermined characters as can be displayed from said first to second positions.

20. A field defining method as set forth in claim 19, herein said second step includes a step of designating the type of said field before the step of moving the cursor.

* * * * *

UNITED STATES PATENT AND TRADEMARK OFFICE
CERTIFICATE OF CORRECTION

PATENT NO. : 5,230,062
DATED : July 20, 1993
INVENTOR(S) : Inaki et al.

It is certified that error appears in the above-indentified patent and that said Letters Patent is hereby corrected as shown below:

On the title page, item [75], change "Shioho" to --Shiono--.

Signed and Sealed this

Tenth Day of May, 1994

*Attest:*

BRUCE LEHMAN

*Attesting Officer*  *Commissioner of Patents and Trademarks*